United States Patent
Yamada et al.

(10) Patent No.: US 10,438,616 B2
(45) Date of Patent: Oct. 8, 2019

(54) MAGNETIC RECORDING HEAD WITH SPECIFIED THICKNESS AND SATURATION MAGNETIC FLUX DENSITY PRODUCTS FOR STO MAGNETIC LAYERS

(71) Applicant: Kabushiki Kaisha Toshiba, Tokyo (JP)

(72) Inventors: Kenichiro Yamada, Minato Tokyo (JP); Shuichi Murakami, Shinagawa Tokyo (JP); Naoyuki Narita, Fujisawa Kanagawa (JP); Katsuhiko Koui, Yokohama Kanagawa (JP); Akihiko Takeo, Kokubunji Tokyo (JP); Mariko Shimizu, Kawasaki Kanagawa (JP); Hitoshi Iwasaki, Nerima Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/218,604

(22) Filed: Dec. 13, 2018

(65) Prior Publication Data

US 2019/0115047 A1    Apr. 18, 2019

Related U.S. Application Data

(62) Division of application No. 15/841,364, filed on Dec. 14, 2017, now Pat. No. 10,192,572, which is a
(Continued)

(30) Foreign Application Priority Data

Dec. 24, 2015 (JP) .................................. 2015-251896

(51) Int. Cl.
*G11B 5/235* (2006.01)
*G11B 5/31* (2006.01)
(Continued)

(52) U.S. Cl.
CPC .............. *G11B 5/1278* (2013.01); *G11B 5/17* (2013.01); *G11B 5/235* (2013.01); *G11B 5/314* (2013.01);
(Continued)

(58) Field of Classification Search
None
See application file for complete search history.

(56) References Cited

U.S. PATENT DOCUMENTS

| | | |
|---|---|---|
| 8,824,104 B1 | 9/2014 | Koui et al. |
| 9,202,484 B1 | 12/2015 | Watanabe et al. |

(Continued)

FOREIGN PATENT DOCUMENTS

| | | |
|---|---|---|
| JP | 2009-70541 A | 4/2009 |
| JP | 2010-3353 A | 1/2010 |

(Continued)

OTHER PUBLICATIONS

Zhu et al., "AC-13 A Novel Perpendicular spin Torque Oscillator Design for High Data Rate Microwave Assisted Magnetic Recording," Abstract from the 59th Conference on Magnetism and Magnetic Materials (MMM2014), (2014).

(Continued)

*Primary Examiner* — Craig A. Renner
(74) *Attorney, Agent, or Firm* — Finnegan, Henderson, Farabow, Garrett & Dunner, L.L.P.

(57) ABSTRACT

According to one embodiment, a magnetic recording head includes a magnetic pole, a stacked body, and a first non-magnetic layer. The stacked body includes a first magnetic layer, a second magnetic layer provided between the first magnetic layer and the magnetic pole, and a non-magnetic intermediate layer provided between the first magnetic layer and the second magnetic layer. The first non-magnetic layer is provided between the second magnetic layer and the
(Continued)

magnetic pole, and contacts the magnetic pole and the second magnetic layer. The first magnetic layer has a first thickness and a first saturation magnetic flux density. The second magnetic layer has a second thickness and a second saturation magnetic flux density. A second product of the second thickness and the second saturation magnetic flux density is larger than a first product of the first thickness and the first saturation magnetic flux density.

16 Claims, 14 Drawing Sheets

Related U.S. Application Data division of application No. 15/254,236, filed on Sep. 1, 2016, now Pat. No. 9,886,971.

(51) Int. Cl.
    *G11B 5/17*     (2006.01)
    *G11B 5/127*     (2006.01)
    *G11B 5/00*     (2006.01)

(52) U.S. Cl.
    CPC .......... *G11B 5/3133* (2013.01); *G11B 5/3143* (2013.01); *G11B 5/3146* (2013.01); *G11B 2005/0024* (2013.01)

(56) References Cited

U.S. PATENT DOCUMENTS

| | | | |
|---|---|---|---|
| 9,230,569 | B1 | 1/2016 | Shimoto et al. |
| 2008/0304176 | A1* | 12/2008 | Takagishi et al. ... G11B 5/3133 360/86 |
| 2009/0052095 | A1 | 2/2009 | Yamada et al. |
| 2009/0316304 | A1 | 12/2009 | Funayama et al. |
| 2012/0126905 | A1 | 5/2012 | Zhang et al. |
| 2012/0154952 | A1* | 6/2012 | Yamada et al. ...... G11B 5/3146 360/125.12 |
| 2013/0148242 | A1 | 6/2013 | Koui et al. |
| 2014/0063648 | A1 | 3/2014 | Shiroishi et al. |
| 2015/0124347 | A1 | 5/2015 | Shimoto et al. |
| 2015/0228295 | A1 | 8/2015 | Shimoto et al. |

FOREIGN PATENT DOCUMENTS

| | | |
|---|---|---|
| JP | 2010-225230 A | 10/2010 |
| JP | 2012-108981 A | 6/2012 |
| JP | 2013-120610 A | 6/2013 |
| JP | 2014-49145 A | 3/2014 |
| JP | 2015-11745 A | 1/2015 |

OTHER PUBLICATIONS

Greaves et al., "The Dynamics of Microwave-Assisted Magnetic Recording," IEEE Transactions on Magnetics 51:1-4 (Apr. 2015).

* cited by examiner

FIG. 1A
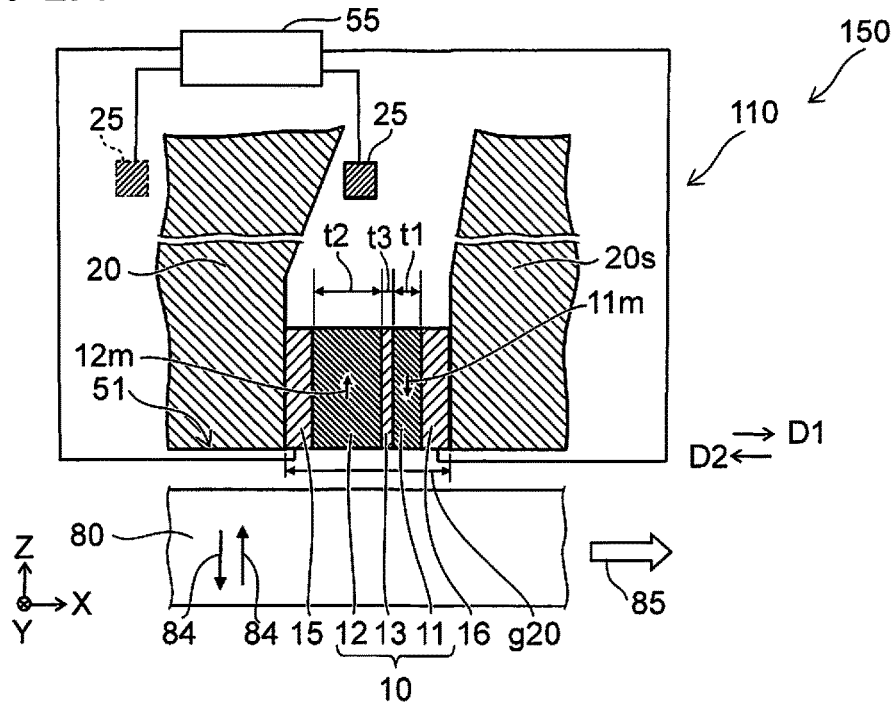
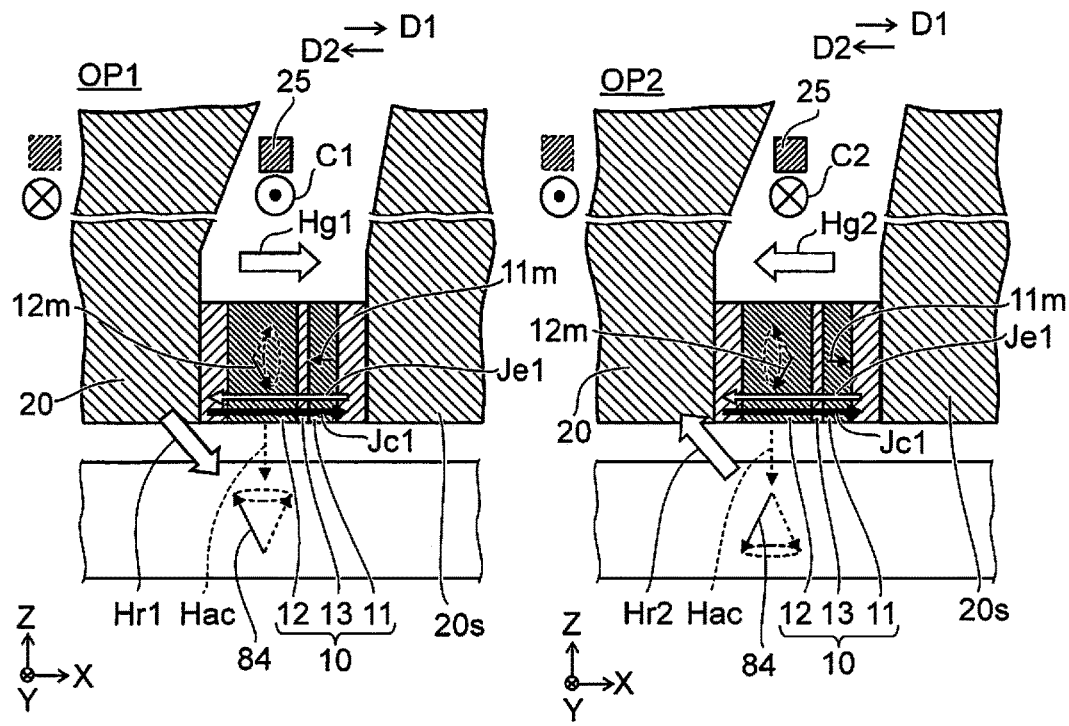
FIG. 1B                    FIG. 1C

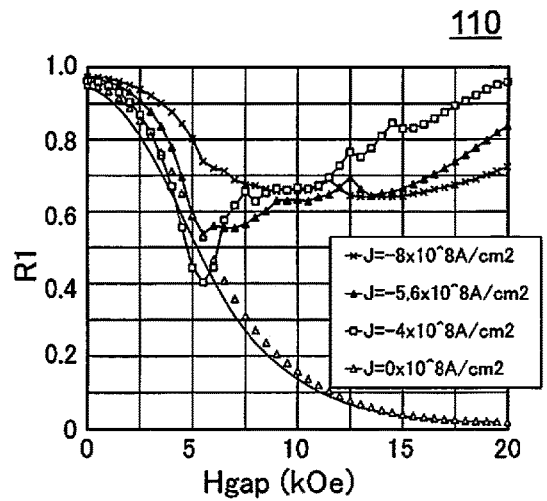
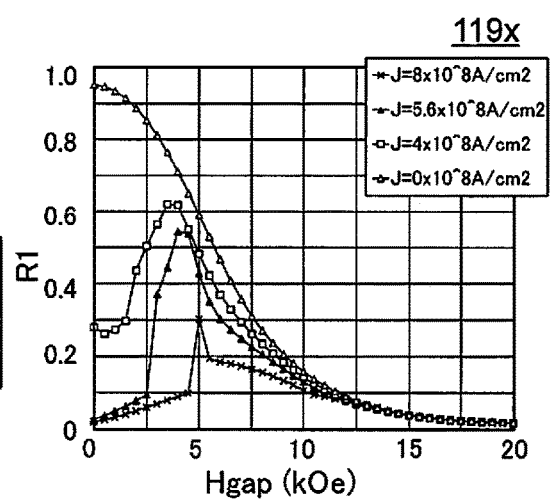
FIG. 6A　　　　　　　FIG. 6B
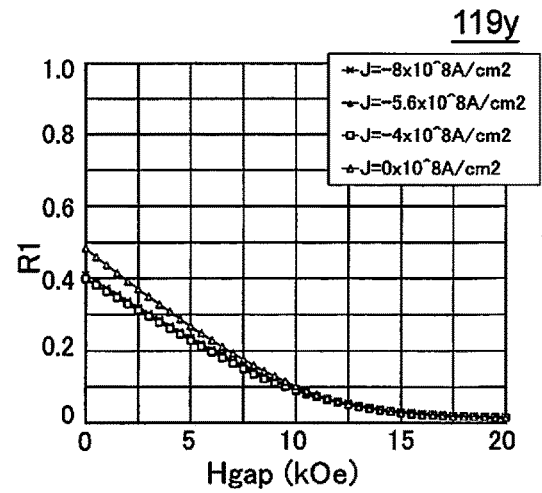
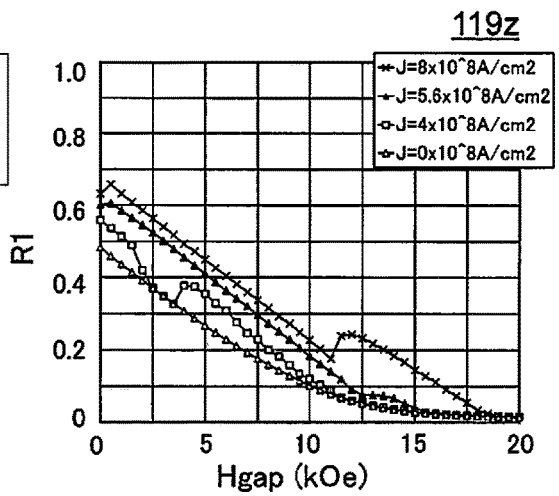
FIG. 6C　　　　　　　FIG. 6D

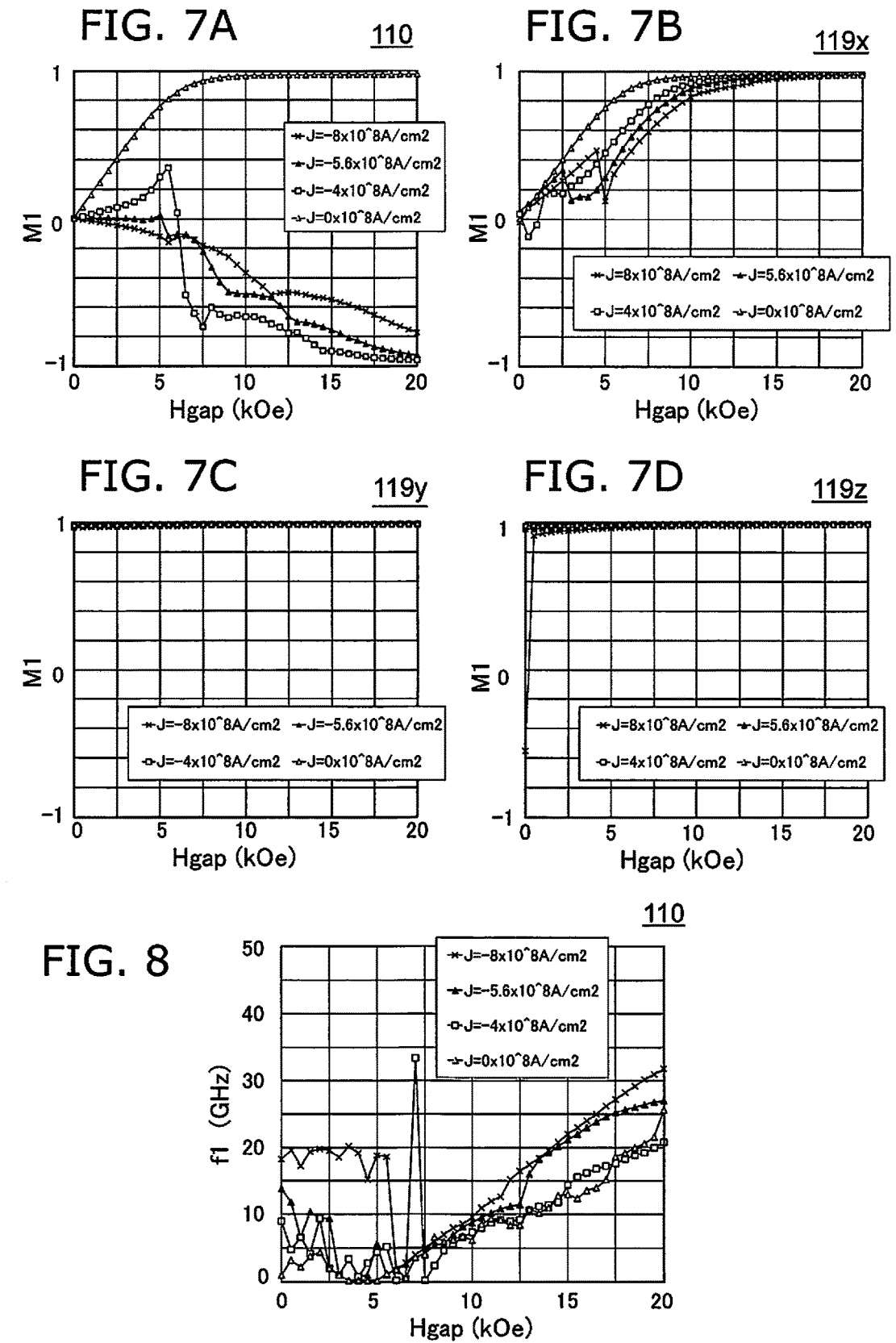

FIG. 13A
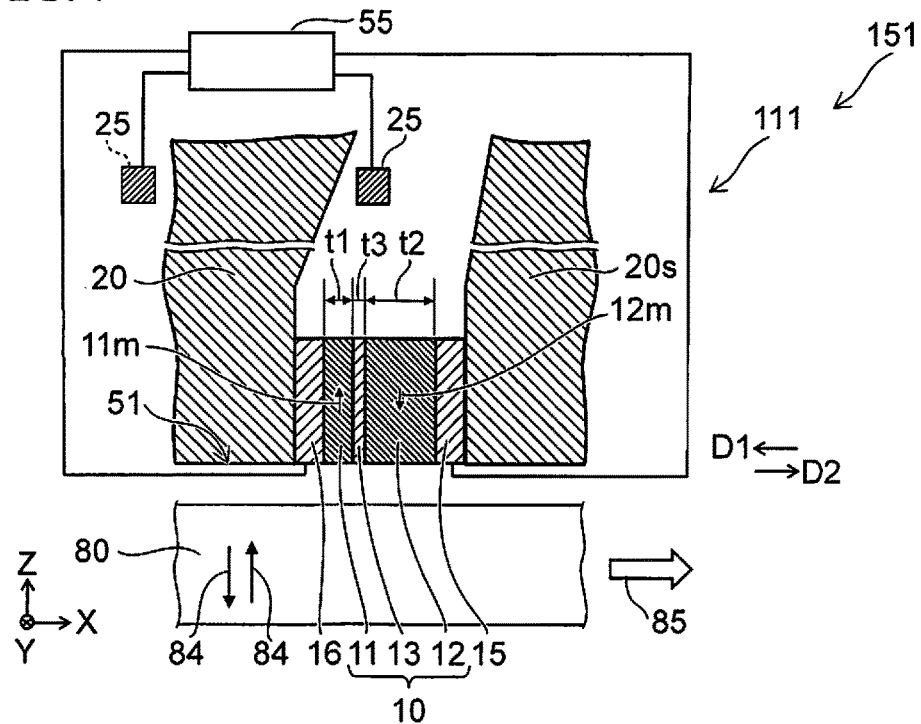
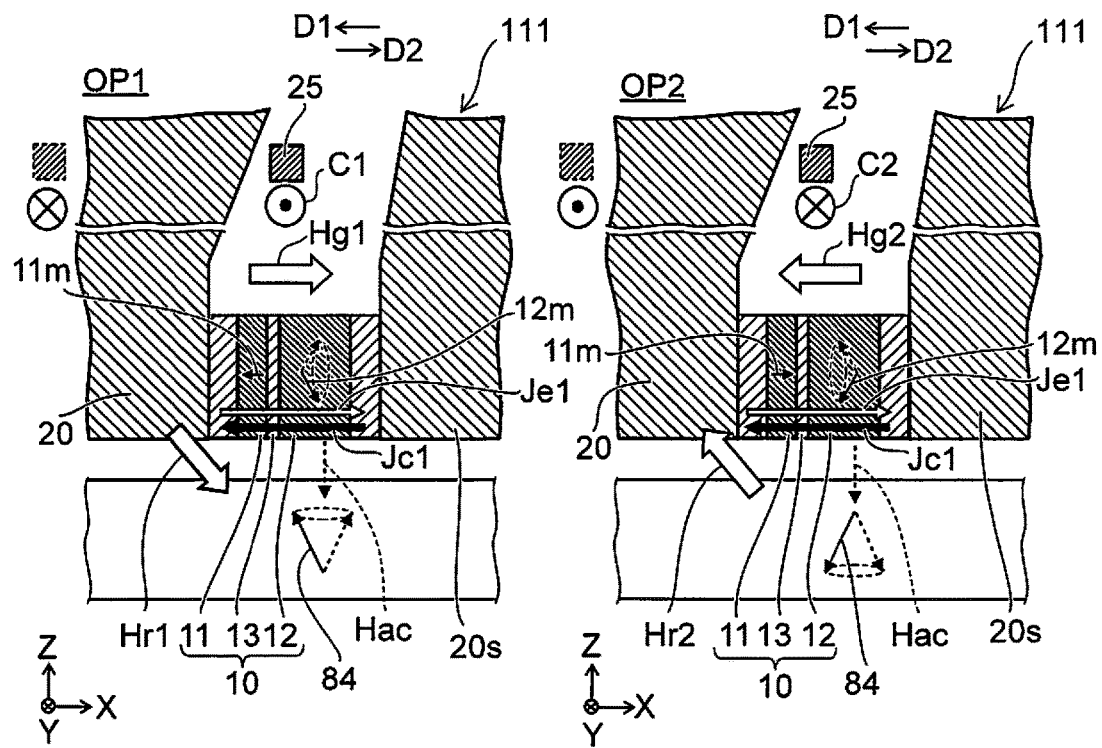
FIG. 13B    FIG. 13C

MAGNETIC RECORDING HEAD WITH SPECIFIED THICKNESS AND SATURATION MAGNETIC FLUX DENSITY PRODUCTS FOR STO MAGNETIC LAYERS

CROSS-REFERENCE TO RELATED APPLICATIONS

This is a division of application Ser. No. 15/841,364, filed Dec. 14, 2017, which is a division of application Ser. No. 15/254,236, filed Sep. 1, 2016 (now U.S. Pat. No. 9,886,971, issued Feb. 6, 2018), both of which are incorporated herein by reference.

This application is based upon and claims the benefit of priority from Japanese Patent Application No. 2015-251896, filed on Dec. 24, 2015; the entire contents of which are incorporated herein by reference.

FIELD

Embodiments described herein relate generally to a magnetic recording head and a magnetic recording and reproducing device.

BACKGROUND

Information is recorded in a magnetic storage medium such as a HDD (Hard Disk Drive), etc., using a magnetic recording head. It is desirable to increase the recording density of the magnetic recording head and the magnetic recording and reproducing device.

BRIEF DESCRIPTION OF THE DRAWINGS

FIG. 1A to FIG. 1C are schematic cross-sectional views illustrating a magnetic recording head and a magnetic recording and reproducing device according to a first embodiment;

FIG. 6A to FIG. 6D are graphs of characteristics of the magnetic recording head and the magnetic recording and reproducing device;

FIG. 7A to FIG. 7D are graphs of characteristics of the magnetic recording head and the magnetic recording and reproducing device;

FIG. 8 is a graph of characteristics of the magnetic recording head and the magnetic recording and reproducing device according to the first embodiment;

FIG. 13A to FIG. 13C are schematic cross-sectional views illustrating a magnetic recording head and a magnetic recording and reproducing device according to a second embodiment;

DETAILED DESCRIPTION

Figure 2A:
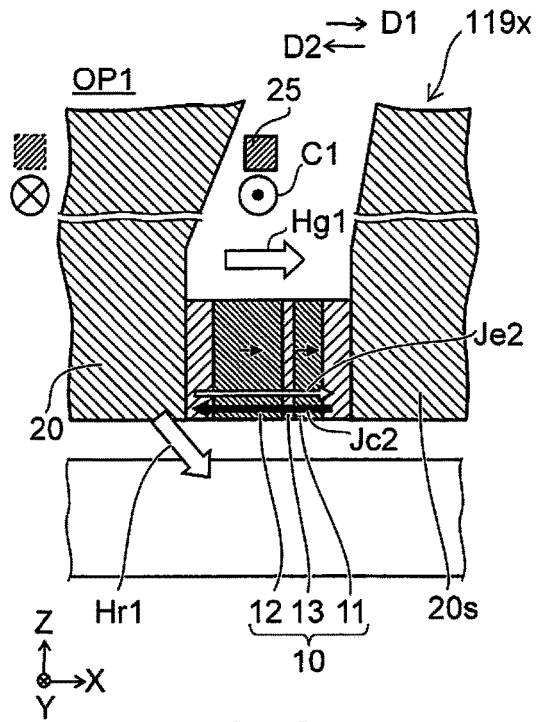
FIG. 2A and FIG. 2B are schematic cross-sectional views illustrating a magnetic recording head and a magnetic recording and reproducing device according to a first reference example.

According to one embodiment, a magnetic recording head includes a magnetic pole, a stacked body, and a first non-magnetic layer. The stacked body includes a first magnetic layer, a second magnetic layer provided between the first magnetic layer and the magnetic pole, and a non-magnetic intermediate layer provided between the first magnetic layer and the second magnetic layer. The first non-magnetic layer is provided between the second magnetic layer and the magnetic pole, and contacts the magnetic pole and the second magnetic layer. The first magnetic layer has a first thickness and a first saturation magnetic flux density. The first thickness is along a first direction from the second magnetic layer toward the first magnetic layer. The second magnetic layer has a second thickness along the first direction and a second saturation magnetic flux density. A second product of the second thickness and the second saturation magnetic flux density is larger than a first product of the first thickness and the first saturation magnetic flux density. A current flows from the second magnetic layer toward the first magnetic layer.

According to one embodiment, a magnetic recording head includes a magnetic pole, a shield, a stacked body, and a first non-magnetic layer. The stacked body includes a first magnetic layer provided between the magnetic pole and the shield, a second magnetic layer provided between the first magnetic layer and the shield, and a non-magnetic intermediate layer provided between the first magnetic layer and the shield. The first non-magnetic layer is provided between the second magnetic layer and the shield, and contacts the shield and the second magnetic layer. The first magnetic layer has a first thickness and a first saturation magnetic flux density. The first thickness is along a first direction from the second magnetic layer toward the first magnetic layer. The second magnetic layer has a second thickness along the first direction and a second saturation magnetic flux density. A second product of the second thickness and the second saturation magnetic flux density is larger than a first product of the first thickness and the first saturation magnetic flux density. A current flows from the second magnetic layer toward the first magnetic layer.

According to one embodiment, a magnetic recording head includes a magnetic pole, a shield, and a stacked body provided between the magnetic pole and the shield. The stacked body includes a first magnetic layer, a second magnetic layer being separated from the first magnetic layer in a direction crossing a direction from the magnetic pole toward the shield, a non-magnetic intermediate layer provided between the first magnetic layer and the second magnetic layer. The first magnetic layer has a first thickness and a first saturation magnetic flux density. The first thickness is along a first direction from the second magnetic layer toward the first magnetic layer. The second magnetic layer has a second thickness along the first direction and a second saturation magnetic flux density. A second product of the second thickness and the second saturation magnetic flux density is larger than a first product of the first thickness and the first saturation magnetic flux density. A current flows from the second magnetic layer toward the first magnetic layer.

According to one embodiment, a magnetic recording and reproducing device includes one of magnetic recording heads described above, a magnetic recording medium to which information is recorded by the magnetic pole, and a controller configured to make the current flow in the stacked body.

Various embodiments will be described hereinafter with reference to the accompanying drawings.

The drawings are schematic or conceptual. The relationship between the thickness and the width of each portion, and the size ratio between the portions are not necessarily identical to those in reality. Furthermore, the same portion may be shown with different dimensions or ratios in different figures.

In the present specification and drawings, the same elements as those described previously with reference to earlier figures are labeled with like reference numerals, and the detailed description thereof is omitted as appropriate.

(First Embodiment)

FIG. 1A to FIG. 1C are schematic cross-sectional views illustrating a magnetic recording head and a magnetic recording and reproducing device according to a first embodiment.

FIG. 1B and FIG. 1C illustrate a state (operation) of the magnetic recording head and the magnetic recording and reproducing device.

As shown in FIG. 1A, a magnetic recording and reproducing device 150 according to the embodiment include a magnetic recording head 110 according to the embodiment and a magnetic recording medium 80. The magnetic recording head 110 records information to the magnetic recording medium 80.

The magnetic recording head 110 includes a magnetic pole 20, a stacked body 10, and a first non-magnetic layer 15.

The magnetic pole 20 applies a magnetic field (recording magnetic field) to the magnetic recording medium 80. The magnetic pole 20 is, for example, a main magnetic pole.

The stacked body 10 includes a first magnetic layer 11, a second magnetic layer 12, and an intermediate layer 13. The second magnetic layer 12 is provided between the first magnetic layer 11 and the magnetic pole 20. The intermediate layer 13 is provided between the first magnetic layer 11 and the second magnetic layer 12. The intermediate layer 13 is non-magnetic. As described later, the stacked body 10 generates a high frequency magnetic field. The high frequency magnetic field is applied to the magnetic recording medium 80. Recording of information to the magnetic recording medium by the magnetic pole 20 is assisted by the high frequency magnetic field. In the magnetic recording head 110, for example, high frequency assist recording is performed. The stacked body 10 functions as, for example, a spin torque oscillator (STO).

The first non-magnetic layer 15 is provided between the second magnetic layer 12 and the magnetic pole 20. The first non-magnetic layer 15 contacts the magnetic pole 20 and the second magnetic layer 12. A magnetic layer is not provided between the magnetic pole 20 and the second magnetic layer 12. The first non-magnetic layer 15 is, for example, a metal layer. This metal layer may include an alloy. The first non-magnetic layer 15 may include multiple stacked films (metal films).

In this example, a shield 20s and a second non-magnetic layer 16 are further provided. The stacked body 10 is disposed between the magnetic pole 20 and the shield 20s. The first non-magnetic layer 15 is disposed between the magnetic pole 20 and the stacked body 10. The second non-magnetic layer 16 is provided between the shield 20s and the stacked body 10. In this example, the second non-magnetic layer 16 is disposed between the first magnetic layer 11 and the shield 20s.

The second non-magnetic layer 16 is, for example, a metal layer. This metal layer may include an alloy. The second non-magnetic layer 16 may include multiple stacked films (metal films).

The magnetic recording head 110 opposes the magnetic recording medium 80. The magnetic recording head 110 has a medium-opposing surface 51 (ABS: Air Bearing Surface). The magnetic recording medium 80 moves relative to the medium-opposing surface 51 of the magnetic recording head 110. A medium movement direction 85 of the magnetic recording medium 80 is substantially parallel to the medium-opposing surface 51. The recording magnetic field is applied from the magnetic pole 20 to each of different positions of the magnetic recording medium 80 in accordance with the movement of the magnetic recording medium 80. A direction of magnetization 84 of the magnetic recording medium 80 is changed by the recording magnetic field.

The magnetic recording medium 80 is, for example, a perpendicular magnetization film. A state of the magnetization 84 being upward, for example, corresponds to one of information of "1" or "0". A state of the magnetization 84 being downward, for example, corresponds to other one of information of "1" or "0".

The shield 20s is, for example, a trailing shield. For example, one position of the magnetic recording medium 80 opposes the shield 20s after opposing the magnetic pole 20.

The magnetic recording head 110 is provided with a coil 25. The coil 25 generates a magnetic field from the magnetic pole 20. For example, a direction of the magnetic field (for example, recording magnetic field) generated in the magnetic pole 20 changes depending on a direction of a current flowing in the coil 25. The direction of the current flowing in the coil 25 corresponds to, for example, information to be recorded.

In this example, a controller 55 is further provided. The controller 55 is included in the magnetic recording and reproducing device 150. The controller 55 may be attached to the magnetic recording head 110.

The controller 55 is electrically connected to the coil 25. For example, a current is supplied to the coil 25 from the controller 55. The direction of the current is controlled by the controller 55.

The controller 55 is, for example, electrically connected to the first non-magnetic layer 15 and the second non-magnetic layer 16. As described later, the current flows in the stacked body 10. This current is, for example, supplied by the controller 55. The first non-magnetic layer 15 and the second non-magnetic layer 16 function, for example, as electrodes. Electrical connection between the controller 55 and the first non-magnetic layer 15 may be via the magnetic pole 20. Electrical connection between the controller 55 and the second non-magnetic layer 16 may be via the shield 20s.

A direction from the magnetic recording medium 80 toward the magnetic recording head 110 is taken as a Z-direction. One direction perpendicular to the Z-direction is taken as an x-direction. A direction perpendicular to the Z-direction and the X-direction is taken as a Y-direction. The Z-direction is a height direction. The X-direction is along a down track direction. The Y-direction is along a track width direction.

In the magnetic recording head 110, a direction from the second non-magnetic layer 12 toward the first non-magnetic layer 11 is taken as a first direction D1. A direction from the first magnetic layer 11 toward the second magnetic layer 12 is taken as a second direction D2. The second direction D2 is antiparallel to the first direction D1. The first direction D1 and the second direction D2 are, for example, along the X-direction. The first direction D1, the second direction D2 and the X-direction are along a stacking direction of the stacked body 10.

The first magnetic layer 11 has a first thickness t1 along the first direction D1. The second magnetic layer 12 has a second thickness t2 along the first direction D1. The intermediate layer 13 has a third thickness t3 along the first direction D1. For example, a thickness of the stacked body 10 depends on, for example, a sum of the first thickness t1, the second thickness t2 and the third thickness t3.

For example, in the medium-opposing surface 51, a distance (a distance along the first direction D1) between the magnetic pole 20 and the shield 20s is taken as a gap length g20. Decreasing the gap length g20 allows the recording density to be improved. Thinning the thickness of the stacked body 10 allows the gap length g20 to be decreased.

In the embodiment, the first thickness t1 of the first magnetic layer 11 is set to be thin relatively. Thereby, the thickness of the stacked body 10 can be thin and the gap length g20 can be decreased.

In a magnetic film, a magnetic film thickness is defined. The magnetic film thickness is a product of the thickness t of the magnetic film and a saturation magnetic flux density Bs of the magnetic film.

In the embodiment, the magnetic film thickness of the second magnetic layer 12 is larger than the magnetic film thickness of the first magnetic layer 11. The first magnetic layer 11 has the first thickness t1 along the first direction D1 and a first saturation magnetic flux density Bs1. The second magnetic layer 12 has the second thickness t2 along the first direction D1 and a second saturation magnetic flux density Bs2. In the embodiment, a second product (t2·Bs2) of the second thickness t2 and the second saturation magnetic flux density Bs2 is larger than a first product (t1·Bs1) of the first thickness t1 and the first saturation magnetic flux density Bs1.

Furthermore, in the embodiment, the current flowing in the stacked body 10 is a special condition. That is, in the embodiment, the current flows from the second magnetic layer 12 toward the first magnetic layer 11. In the following, operations according to the embodiment will be described.

FIG. 1B illustrates a first operation OP1. The first operation OP1 corresponds to a first state in the magnetic recording head 110. In the first operation OP1, a first coil current C1 flows in the coil 25. In a region between the magnetic pole 20 and the shield 20s, a direction of the first coil current C1 is, for example, reverse (antiparallel) to the Y-direction.

In the first operation OP1 (first state), a first magnetic pole magnetic field Hg1 generated from the magnetic pole 20 has a component along the first direction D1. At this time, a first current Jc1 flows in the first direction D1 in the stacked body 10. At this time, a first electron flow Je1 is flown. A direction of the first electron flow Je1 is reverse to a direction of the first current Jc1. This first current Jc1 is not less than a threshold current at which the stacked body 10 oscillates. At this time, in the stacked body 10, a high frequency magnetic field Hac is generated. The high frequency magnetic field Hac is applied to the magnetic recording medium 80. The magnetization 84 of the magnetic recording medium 80 becomes easy to reverse by the high frequency magnetic field Hac.

In the first operation OP1, a first recording magnetic field Hr1 is generated from the magnetic pole 20. The first recording magnetic field Hr1 is based on the first coil current C1. The first recording magnetic field Hr1 is applied to the magnetic recording medium 80. The magnetization 84 of the magnetic recording medium 80 is along a direction of the first recording magnetic field Hr1. For example, the magnetization 84 is reversed. For example, the high frequency assist recording is performed. Thereby, recording of first information (for example, one of "1" or "0") is performed.

FIG. 1C illustrates a second operation OP2. The second operation OP2 corresponds to a second state in the magnetic recording head 110. In the second operation OP2, a second coil current C2 flows in the coil 25. In a region between the magnetic pole 20 and the shield 20s, a direction of the second coil current C2 is, for example, the Y-direction.

In the second operation OP2 (second state), a second magnetic pole magnetic field Hg2 generated from the magnetic pole 20 has a component along the second direction D2 (reverse, antiparallel to first direction D1). Also at this time, the first current Jc1 in the first direction D1 is flown. This first current Jc1 is not less than the threshold current at which the stacked body 10 oscillates. At this time, in the stacked body 10, the high frequency magnetic field Hac is generated. The high frequency magnetic field Hac is applied to the magnetic recording medium 80. The magnetization 84 of the magnetic recording medium 80 becomes easy to reverse by the high frequency magnetic field Hac.

In the second operation OP2, a second recording magnetic field Hr2 is generated from the magnetic pole 20. The second recording magnetic field Hr2 is based on the second coil current C2. The second recording magnetic field Hr2 is applied to the magnetic recording medium 80. The magnetization 84 of the magnetic recording medium 80 is along a direction of the second recording magnetic field Hr2. For example, the magnetization 84 is reversed. For example, the high frequency assist recording is performed. Thereby, recording of second information (for example, other one of "1" or "0") is performed.

As described above, in the embodiment, the first thickness t1 of the first magnetic layer 11 is set to be thin. Furthermore, the current (first current Jc1) flows in the stacked body 10 from the second magnetic layer 12 toward the first magnetic layer 11. Thereby, it has been seen that the high frequency magnetic field Hac is generated from the stacked body 10.

In the embodiment, the gap length g20 is small due to the thin first magnetic layer 11. In this configuration, the high frequency magnetic field Hac is generated from the stacked body 10 by making the current flow in the stacked body 10 in the above direction. For example, the high frequency assist recording is implemented by this high frequency magnetic field Hac. Even if the gap length g20 is small, the high frequency assist recording is possible.

According to the embodiment, a magnetic recording head capable of improving the recording density and a magnetic recording and reproducing device can be provided by the small gap length g20 and the high frequency magnetic field Hac.

An example of the operation of the stacked body 10 in the embodiment will be described.

FIG. 1A corresponds to, for example, the state (initial state) where the current is not supplied to the coil 25. In this state, a direction of magnetization 12m of the second magnetic layer 12 is the Z-direction. The second magnetic layer 12 is, for example, an in-plane magnetization film. At this time, a direction of magnetization 11m of the first magnetic layer 11 is −Z-direction (reverse (antiparallel) direction to Z-direction). The first magnetic layer 11 is, for example, an in-plane magnetization film. The direction of the magnetization 11m of the first magnetic layer 11 is easy to change. Thereby, the first state and the second state are produced.

In the first state (first operation OP1) illustrated in FIG. 1B, spin is reflected at an interface between the second magnetic layer 12 and the intermediate layer 13 by the first electron flow Je1 in the second direction D2. The reflected spin travels to the first magnetic layer 11. The reflection spin torque is injected from the second magnetic layer 12 toward the first magnetic layer 11. The magnetization 11m of the first magnetic layer 11 becomes reverse to the direction of the first magnetic pole magnetic field Hg1. The spin is injected from the first magnetic layer 11 toward the second magnetic layer 12 by the first electron flow Je1 in the second direction D2. The magnetization 12m rotates in the second magnetic layer 12. Thereby, the high frequency magnetic field Hac is generated.

In the second state (second operation OP1) illustrated in FIG. 1C, spin is reflected at an interface between the second magnetic layer 12 and the intermediate layer 13 by the first electron flow Je1 in the second direction D2. The reflected spin travels to the first magnetic layer 11. The reflected spin torque is injected from the second magnetic layer 12 toward the first magnetic layer 11. The magnetization 11m of the first magnetic layer 11 becomes reverse to the direction of the second magnetic pole magnetic field Hg2. The spin is injected from the first magnetic layer 11 toward the second magnetic layer 12 by the first electron flow Je1 in the second direction D2. The magnetization 12m rotates in the second magnetic layer 12. Thereby, the high frequency magnetic field Hac is generated.

The first magnetic layer 11 functions as, for example, a spin injection layer. The second magnetic layer 12 functions as, for example, a magnetic field generating layer.

In the embodiment, a current is flown from the second magnetic layer 12 toward the first magnetic layer 11. Thereby, it has been seen that even if the first magnetic layer is made thin, excellent oscillation characteristics are obtained.

In the following, an example of the characteristics of the embodiment will be described with reference examples.

Figure 2B:
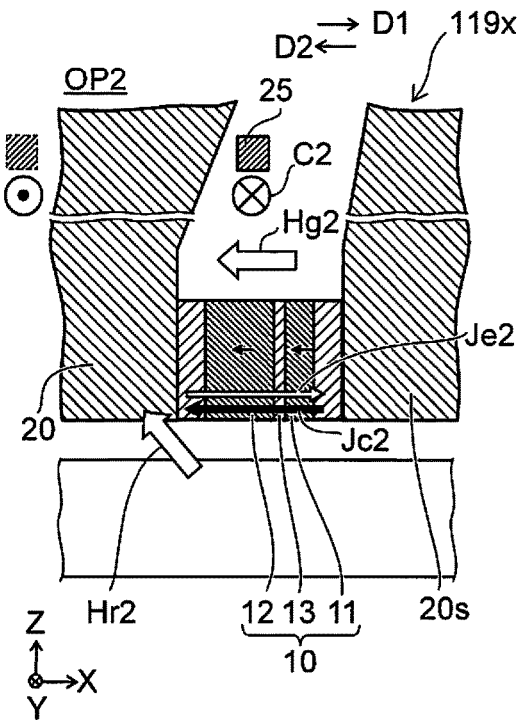

FIG. 2A and FIG. 2b are schematic cross-sectional views illustrating a magnetic recording head and a magnetic recording and reproducing device according to a first reference example.

These figures show the configuration and operation of a magnetic recording head 119x of the first reference example.

Also in the magnetic recording head 119x, the first magnetic layer 11, the second magnetic layer 12 and the intermediate layer 13 are provided. The configurations of these magnetic layers are the same as the magnetic recording head 110. In the recording head 119x, a current in the operation is different from that of the magnetic recording head 110.

As shown in FIG. 2A and FIG. 2B, in the first operation OP1 and the second operation OP2, a second current Jc2 flows from the first magnetic layer 11 toward the second magnetic layer 12. At this time, a second electron flow Je1 flows from the second magnetic layer 12 toward the first magnetic layer 11. In the magnetic recording head 119x, the first magnetic layer 11 is thin, and thus the gap length g20 can be small. However, as described later, an excellent high frequency magnetic field is not generated. The high frequency assist recording is difficult.

Figure 3A:
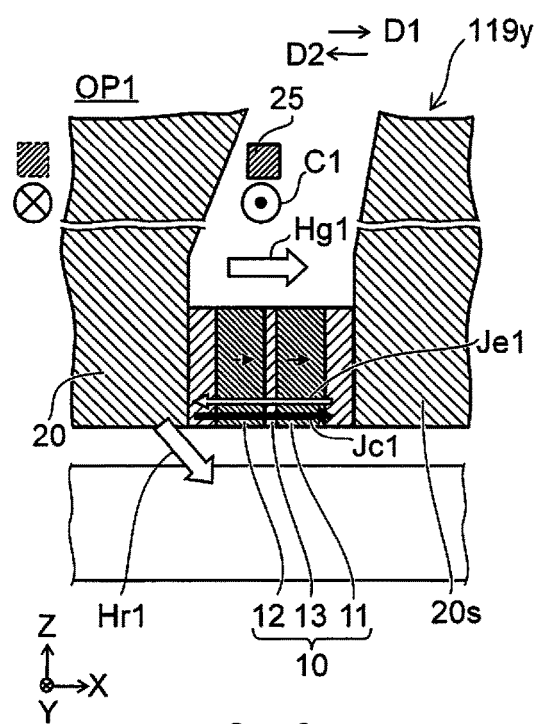
FIG. 3A and FIG. 3B are schematic cross-sectional views illustrating a magnetic recording head and a magnetic recording and reproducing device according to a second reference example.
Figure 3B:
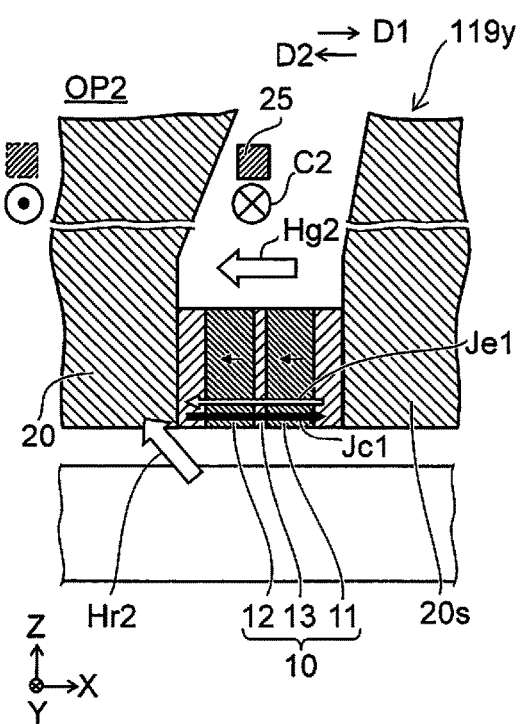

FIG. 3A and FIG. 3B are schematic cross-sectional views illustrating a magnetic recording head and a magnetic recording and reproducing device according to a second reference example.

These figures show the configuration and operation of a magnetic recording head 119y of the second reference example.

Also in the magnetic recording head 119y, the first magnetic layer 11, the second magnetic layer 12 and the intermediate layer 13 are provided. In the magnetic recording head 119y, the first magnetic layer 11 is thicker than that of the magnetic recording head 110. On the other hand, in the magnetic recording head 119y, a current in the operation is the same as that of the magnetic recording head 110.

As shown in FIG. 3A and FIG. 3B, in the first operation OP1 and the second operation OP2, the first current Jc1 flows from the second magnetic layer 12 toward the first magnetic layer 11. At this time, the first electron flow Je1 flows from the first magnetic layer 11 toward the second magnetic layer 12. In the magnetic recording head 119y, the first magnetic layer 11 is thick, and thus the gap length g20 is large. As described later, an excellent high frequency magnetic field is not generated. The high frequency assist recording is difficult.

Figure 4A:
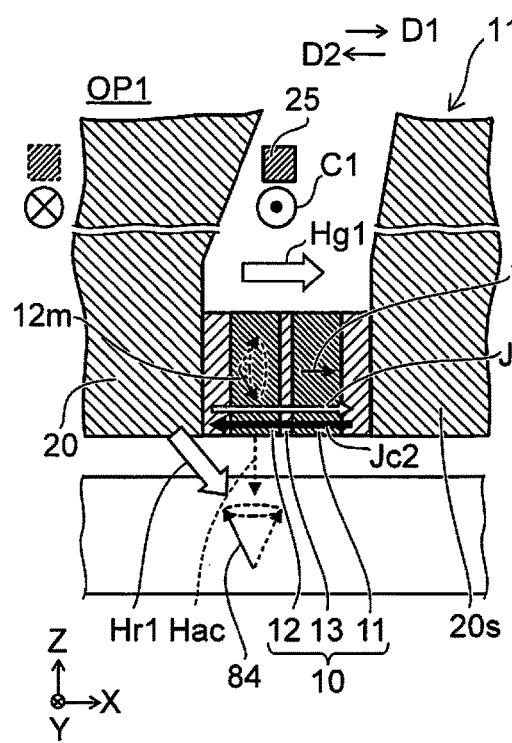
FIG. 4A and FIG. 4B are schematic cross-sectional views illustrating a magnetic recording head and a magnetic recording and reproducing device according to a third reference example.
Figure 4B:
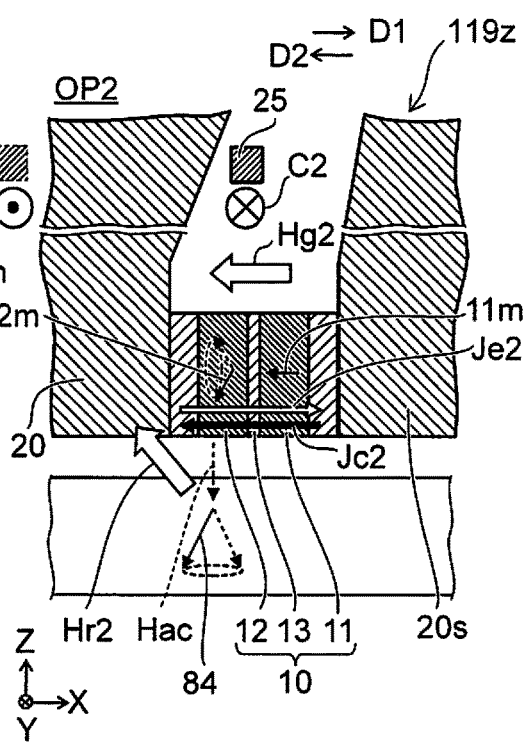

FIG. 4A and FIG. 4B are schematic cross-sectional views illustrating a magnetic recording head and a magnetic recording and reproducing device according to a third reference example.

These figures show the configuration and operation of a magnetic recording head 119z of the third reference example.

Also in the magnetic recording head 119z, the first magnetic layer 11, the second magnetic layer 12 and the intermediate layer 13 are provided. In the magnetic recording head 119z, the first magnetic layer 11 is thicker than that of the magnetic recording head 110. Furthermore, in the magnetic recording head 119z, a current in the operation is different from that of the magnetic recording head 110, and is the same as that of the magnetic recording head 119x.

As shown in FIG. 4A and FIG. 4B, in the first operation OP1 and the second operation OP2, the second current Jc2 flows from the first magnetic layer 11 toward the second magnetic layer 12. At this time, the second electron flow Je1 flows from the second magnetic layer 12 toward the first magnetic layer 11. In the magnetic recording head 119z, the first magnetic layer 11 is thick, and thus the gap length g20 is large. As described later, an excellent high frequency magnetic field is generated. The magnetic recording head 119z has the general configuration which has been known conventionally. In the magnetic recording head 119z, the high frequency assist recording is possible. However, the gap length g20 is large, and thus the recording density cannot be improved sufficiently.

In the following, examples of the simulation results of the characteristics (characteristics of magnetic recording and reproducing device) of these magnetic recording heads will be described. A simulation model is as follows.

In the magnetic recording heads 110 and 119x, a length of the first magnetic layer 11 in the Z-direction is 35 nm, and a length in the Y-direction is 35 nm. The thickness (first thickness t1) of the first magnetic layer 11 in the X-direction is 4 nm. The saturation magnetic flux density Bs (first saturation magnetic flux density Bs1) of the first magnetic layer 11 is 1.2 T (tesla). An anisotropic magnetic field Hk of the first magnetic layer 11 is 2 kOe (kilooersted). An exchange stiffness constant in the first magnetic layer 11 is $1.4 \times 10^{-6}$ erg/cm (erg/centimeter). A spin polarization ratio Po in the first magnetic layer 11 is 0.48.

In the magnetic recording heads 119y and 119z, the thickness (first thickness t1) of the first magnetic layer 11 in the X-direction is 11 nm. In the magnetic recording heads 119y and 119z, a perpendicular magnetic anisotropic magnetic field Hk of the first magnetic layer 11 is 18 kOe. In the magnetic recording heads 119y and 119z, conditions other than these are the same as those of the magnetic recording heads 110 and 119x.

Except the first magnetic layer 11, the configuration of the stacked body 10 is the same in the magnetic recording heads 110, 119x, 119y and 119z.

A length of the second magnetic layer 12 in the Z-direction is 35 nm, and a length in the Y-direction is 35 nm. The thickness (second thickness t2) of the second magnetic layer 12 in the X-direction is 10 nm. The saturation magnetic flux density Bs (second saturation magnetic flux density Bs2) of the second magnetic layer 12 is 2.2 T (tesla). A perpendicular magnetic anisotropic magnetic field Hk of the second magnetic layer 12 is −4 kOe (kilooersted). An exchange stiffness constant in the second magnetic layer 12 is $2 \times 10^{-6}$ erg/cm. A spin polarization ratio Po in the second magnetic layer 12 is 0.48.

A distance (third thickness t3 of intermediate layer 13) between the first magnetic layer 11 and the second magnetic layer 12 is 2 nm. In the intermediate layer 13, an exchange coupling constant is 0.

In the magnetic field applied to the stacked body 10, a ratio (Hy/Hx) of the Y-direction component of the magnetic field to the X-direction component of the magnetic field is −10%. The magnetic field applied to the stacked body 10 is changed in a range from 0 kOe to 20 kOe. This magnetic field corresponds to the gap magnetic field (first magnetic pole magnetic field Hg1 and second magnetic pole magnetic field Hg2).

The following examples are simulation results about the case of transiting from the initial state to the first state (first operation OP1). In the initial state, the current is not flown in the stacked body 10. In the second magnetic layer 12, the magnetic film thickness is relatively large, and thus the magnetization 12m of the second magnetic layer 12 is stable. The perpendicular magnetic anisotropy of the second magnetic layer 12 has a positive small value or a negative value. For this reason, in the magnetic recording heads 110, 119x, 119y and 119z in the initial state, the direction of the magnetization 12m is +Z-direction.

In the magnetic recording heads 119y and 119z, the magnetic film thickness of the first magnetic layer 11 is relatively large. The perpendicular magnetic anisotropic magnetic field of the first magnetic layer 11 has a positive large value. For this reason, the direction of the magnetization 11m of the first magnetic layer 11 is stable. In the magnetic recording heads 119y and 119z in the initial state, the direction of the magnetization 11m is the first direction D1.

In contrast, in the magnetic recording heads 110 and 119x, the magnetic film thickness of the first magnetic layer 11 is relatively small. The perpendicular magnetic anisotropic magnetic field of the first magnetic layer 11 is small. For this reason, the direction of the magnetization 11m of the first magnetic layer 11 is parallel to a stacked plane of the stacked body 10. In the magnetic recording heads 110 and 119z in the initial state, the direction of the magnetization 11m is −Z-direction. When the magnetic field along the first direction D1 is applied to the stacked body 10 in the case where the current is not flown, the average direction of the magnetization 11m is the first direction D1.

In the simulation, the direction of the magnetic field (gap magnetic field Hgap) applied to the stacked body 10 is generally the first direction D1.

The direction of the current flown in the stacked body 10 in the first state (first operation OP1) differs depending on the magnetic recording head. In the magnetic recording heads 110 and 119y, the first current Jc1 in the first direction D1 is flown. In the magnetic recording heads 119x and 119z, the second current Jc2 in the second direction D2 is flown. Magnitude (absolute value) of the current is changed in these current.

The magnetic recording head 119z is a general STO, and the direction of the current also corresponds to a general case. The magnetic recording head 119y corresponds to the case where the direction of the current is reverse to the general case in the general STO. The magnetic recording head 119x corresponds to the case where the first magnetic layer 11 is thin in the direction of the current in the general STO. The magnetic recording head 110 corresponds to the case where the first magnetic layer 11 is thin and the direction of the current is reverse to the current in the general STO.

FIG. 5A to FIG. 5D are graphs of characteristics of the magnetic recording head and the magnetic recording and reproducing device.

FIG. 5A to FIG. 5D correspond to the magnetic recording heads 110, 119x, 119y and 119z, respectively. The horizontal axis represents the intensity (kOe) of the gap magnetic field Hgap. The vertical axis represents the intensity (kOe) of the high frequency magnetic field Hac generated in the stacked body 10. These figures show four cases of a current density J.

Figure 5A:
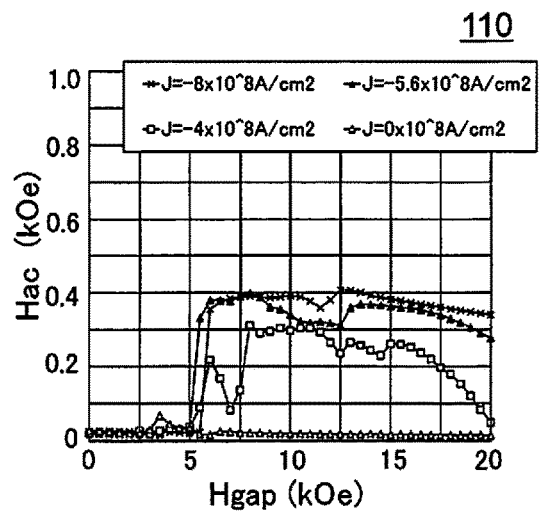
FIG. 5A to FIG. 5D are graphs of characteristics of the magnetic recording head and the magnetic recording and reproducing device.
Figure 5B:
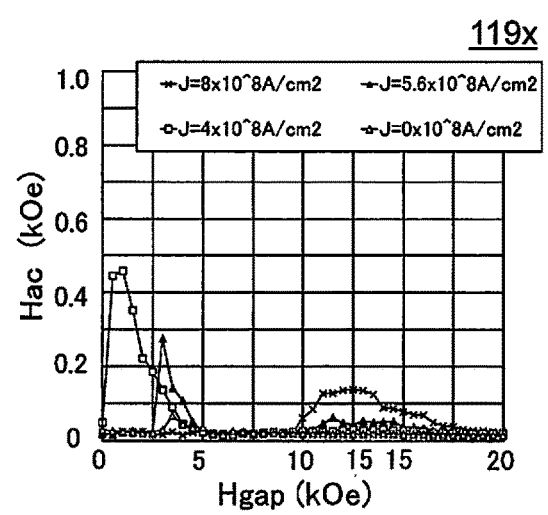
Figure 5C:
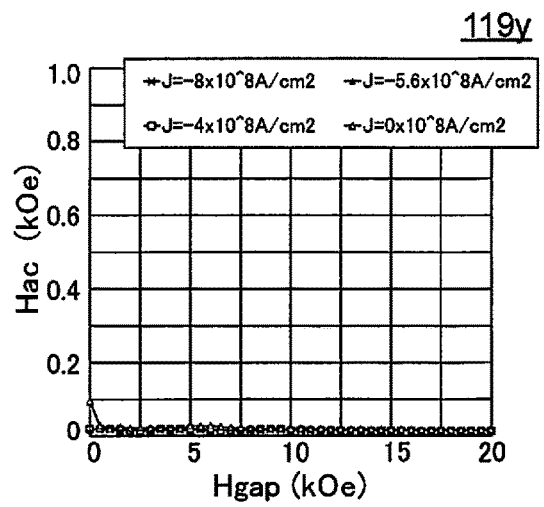
Figure 5D:
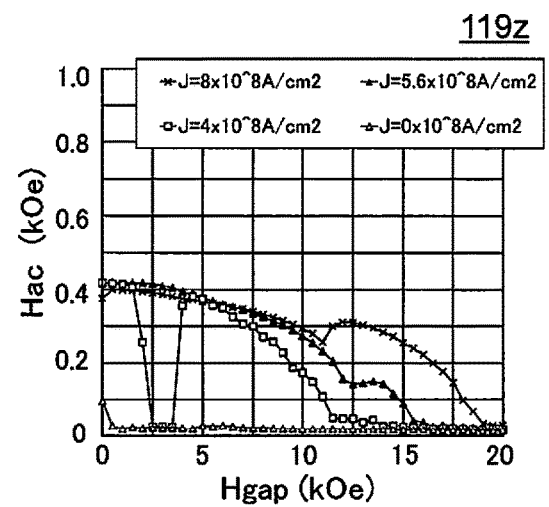

As shown in FIG. 5D, in the magnetic recording head 119z, the high frequency magnetic field Hac with high intensity is obtained also in the high current density J. In this way, in the magnetic recording head 119z (the case of general current direction in the general STO), the high frequency magnetic field Hac is obtained.

As shown in FIG. 5C, in the magnetic recording head 119y, the intensity of the high frequency magnetic field Hac is substantially 0 in any of the current density J. In this way, in the magnetic recording head 119y (the case of reverse current direction in the general STO), the high frequency magnetic field Hac is not obtained. For this reason, in the general STO (the case of the first magnetic layer 11 being thick), the second current Jc2 is applied. That is, the configuration of the magnetic recording head 119z is used.

In contrast, as shown in FIG. 5B, in the magnetic recording head 119x, the intensity of the high frequency magnetic field Hac is low even if the absolute value of the current density J is large. In this way, in the case of the first magnetic layer 11 being thin, if the current direction (second current Jc2) applied in the general STO is used, the high frequency magnetic field Hac is not substantially obtained. For this reason, it has been conventionally considered that the first magnetic layer 11 is difficult to be thin.

However, as shown in FIG. 5A, in the magnetic recording head 110 according to the embodiment, in the case of the large current density J, the high frequency magnetic field Hac with high intensity is obtained. In this way, in the embodiment, the current direction (second current Jc2) in the general STO is not used but the reverse direction (first current Jc1) is used. Thereby, also in the case of the first magnetic layer 11 being thin, the excellent high frequency magnetic field Hac is obtained.

Use of the current in the direction reverse to the current direction adopted in the general STO is a unique and new idea by the inventor of the application. Thereby, the high frequency magnetic field Hac can be generated based on the first magnetic layer 11. Thereby, the gap length g20 can be small, and the magnetic recording head capable of improving the recording density and the magnetic recording and reproducing device can be provided.

FIG. 6A to FIG. 6D are graphs of characteristics of the magnetic recording head and the magnetic recording and reproducing device.

FIG. 6A to FIG. 6D correspond to the magnetic recording heads 110, 119x, 119y and 119z, respectively. The horizontal axis represents the intensity (kOe) of the gap magnetic field Hgap. The vertical axis represents a resistance R1 in the stacked body 10. The resistance R1 is a relative value. The resistance R1 corresponds to an angle between the direction of the magnetization 11m of the first magnetic layer 11 and the direction of the magnetization 12m of the second magnetic layer 12. When the resistance R1 is high (for example, 1), the direction of the magnetization 11m of the first magnetic layer 11 is antiparallel to the direction of the magnetization 12m of the second magnetic layer 12. When the resistance R1 is low (for example, 0), the direction of the magnetization 11m of the first magnetic layer 11 is parallel to the direction of the magnetization 12m of the second magnetic layer 12.

As shown in FIG. 6B to FIG. 6D, in the magnetic recording heads 119x, 119y and 119z, the resistance R1 decreases with increasing gap magnetic field Hgap. This corresponds to that the angle between the magnetization 11m of the first magnetic layer 11 and the magnetization 12m of the second magnetic layer 12 becomes small with increasing gap magnetic field Hgap. With increasing gap magnetic field Hgap, these magnetizations become more parallel each other.

In contrast, as shown in FIG. 6A, in the magnetic recording head 110, when the absolute value of the current density 3 is large, the resistance R1 increases with increasing gap magnetic field Hgap. This corresponds to that, in the case where the current density (large current on some level) having the high absolute value on some level is flown, when the gap magnetic field becomes large, the magnetization 11m of the first magnetic layer 11 reverses from the initial state.

At the current density 3 like this, the high frequency magnetic field Hac with the high intensity shown in FIG. 5A is obtained.

In the embodiment, for example, while flowing the first current Jc1 in the stacked body 10, a third magnetic field (gap magnetic field Hgap) having the component of the first direction D1 described above is applied. At this time, the electrical resistance (resistance R1) between the first magnetic layer 11 and the second magnetic layer 12 increases with the intensity of the third magnetic field. That is, the electrical resistance between the first magnetic layer 11 and the second magnetic layer 12 increases with the intensity of the magnetic field having the component of the first direction D1 when the current (first current Jc1) is flown in the stacked body 10.

For example, in the magnetic recording head 110 according to the embodiment, while flowing a third current having a first range in the first direction D1 in the stacked body 10, the third magnetic field (gap magnetic field Hgap) having a component of the first direction D1 is applied. The third current is a current corresponding to the current density 3 in FIG. 6A. At this time, the electrical resistance (resistance R1) between the first magnetic layer 11 and the second magnetic layer 12 increases with the intensity of the third magnetic field. In the example shown in FIG. 6A, the range of the third current corresponds to a range that the absolute value of the current density 3 is not less than $4 \times 10^8$ A/cm$^2$. The first current Jc1 is set in the range like this. That is, the magnitude of the first current Jc1 is in this range. Thereby, the excellent high frequency magnetic field Hac is obtained in the first operation OP1.

FIG. 7A to FIG. 7D are graphs of characteristics of the magnetic recording head and the magnetic recording and reproducing device.

FIG. 7A to FIG. 7D correspond to the magnetic recording heads 110, 119x, 119y and 119z, respectively. The horizontal axis represents the intensity (kOe) of the gap magnetic field Hgap. The vertical axis represents the direction M1 of the magnetization 11m of the first magnetic layer 11. The direction M1 being "1" corresponds to that the magnetization 11m is in the first direction D1. The direction M1 being "−1" corresponds to that the magnetization 11m is in the second direction D2.

As shown in FIG. 7C and FIG. 7D, in the magnetic recording heads 119y and 119z, the direction M1 of the magnetization 11m of the first magnetic layer 11 is 1. In these magnetic recording heads, the direction of the magnetization 11m does not depend on the current and the gap magnetic field Hgap, and is the first direction D1. In these magnetic recording heads, the direction of the magnetization 11m does not change.

As shown in FIG. 7B, in the magnetic recording head 119x, in the case of the gap magnetic field gap being 0 at any current density 3, the direction (average direction) of the magnetization 11m is 0. When the gap magnetic field Hgap is increased, the direction M1 approaches to 1. That is, the direction M1 of the magnetization 11m becomes along the first direction D1.

As shown in FIG. 7A, in the magnetic recording head 110, in the case where the current density J is 0 and the gap magnetic field Hgap is 0, the direction (average direction) of the magnetization 11m is 0. When the gap magnetic field Hgap is increased at the current density J being 0, the direction M1 approaches to 1. That is, the direction M1 of the magnetization 11m becomes along the first direction D1. On the other hand, when the gap magnetic field Hgap is increased at the current density J being not 0, the direction M1 approaches to −1. That is, the direction M1 of the magnetization 11m changes to the second direction D2. The characteristics are peculiar to the magnetic recording head 110.

In this way, in the embodiment, the magnetization 11m of the first magnetic layer 11 has the peculiar characteristics. Thereby, also in the case of the first magnetic layer 11 being thin, the excellent high frequency magnetic field Hac is obtained.

FIG. 8 is a graph of characteristics of the magnetic recording head and the magnetic recording and reproducing device according to the first embodiment.

FIG. 8 shows a frequency of the high frequency magnetic field Hac generated in the magnetic recording head 110. The horizontal axis represents the intensity (kOe) of the gap magnetic field Hgap. The vertical axis represents a frequency f1 (GHz: gigahertz) of the high frequency magnetic field Hac.

In the embodiment, the gap magnetic field Hgap is, for example, assumed to be 7 kOe to 20 kOe. At this time, the stable high frequency magnetic field Hac is obtained. The frequency f1 of this high frequency magnetic field Hac is, for example, not less than 5 GHz and not more than 25 GHz.

In this way, also in the embodiment, even if the first magnetic layer 11 is made thin, the high frequency magnetic field Hac is obtained.

For example, in the first state (first operation OP1), the magnetization 11m of the first magnetic layer 11 has a component of the second direction D2. In the first state, the direction of the magnetization 11m is antiparallel to the direction of the first magnetic pole magnetic field Hg1. On the other hand, in the second state (second operation OP2), the magnetization 11m of the first magnetic layer 11 has a component of the first direction D1. In the second state, the direction of the magnetization 11m is antiparallel to the direction of the second magnetic pole magnetic field Hg2.

In the embodiment, in the first state and the second state like this, the stacked body 10 generates the high frequency magnetic field Hac.

As already described, the first product (t1·Bs1) of the first magnetic layer 11 is smaller than the second product (t2·Bs2) of the second magnetic layer 12. For example, the second product is not less than 4 times of the first product. For example, the second thickness t2 is not less than 2 times of the first thickness t1.

Figure 9:
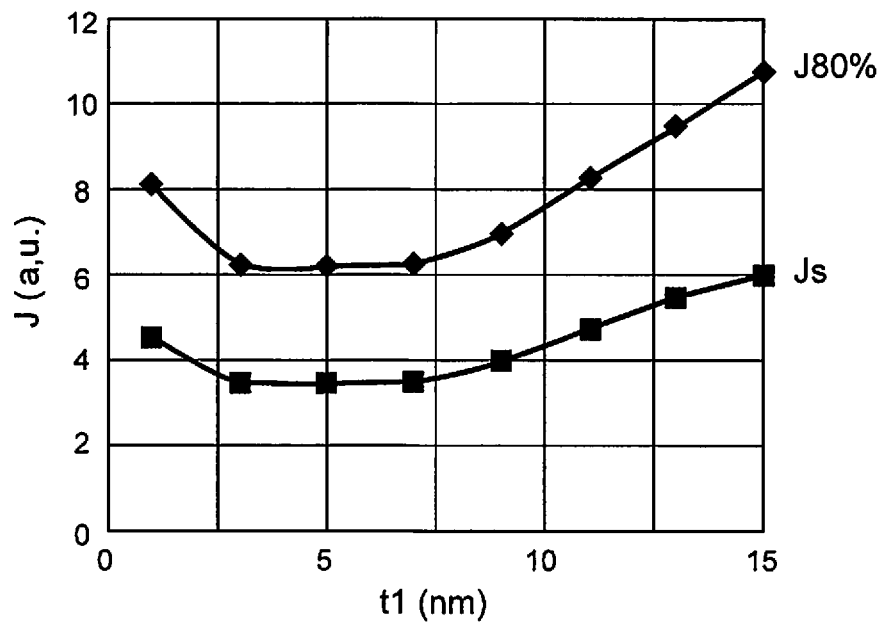
FIG. 9 is a graph of characteristics of the magnetic recording head and the magnetic recording and reproducing device according to the first embodiment.

FIG. 9 is a graph of characteristics of the magnetic recording head and the magnetic recording and reproducing device according to the first embodiment.

FIG. 9 shows the oscillation characteristics of the magnetic recording head 110. The horizontal axis represents the thickness (first thickness t1) of the first magnetic layer 11. The vertical axis represents the current density J (arbitrary unit). In FIG. 9, an oscillation start current density Js and a 80% current density J80% are shown. The oscillation start current density Js is the minimum current density J at which the high frequency magnetic field Hac is generated in the stacked body 10. The 80% current density J80% is a current density J at which a high frequency magnetic field Hac of 80% of the maximum value of the high frequency magnetic field Hac is generated. In the example shown in FIG. 9, the magnetic field (gap magnetic field Hgap) applied to the stacked body 10 is 10 kOe. The gap magnetic field Hgap corresponds to, for example, the first magnetic pole magnetic field Hg1 or the second magnetic pole magnetic field Hg2.

As shown in FIG. 9, the low oscillation start current density Js is obtained in the case where the first thickness t1 of the first magnetic layer 11 is not less than 2 nm and not more than 9 nm. In this range, the low 80% current density J80% is obtained. In the embodiment, the first thickness t1 of the first magnetic layer 11 is favorable to be not less than 2 nm and not more than 9 nm. The first thickness t1 of the first magnetic layer 11 is further favorable to be not less than 2.5 nm and not more than 7.5 nm. Furthermore, the low oscillation start current density Js and further low 80% current density J80% are obtained.

Figure 10:
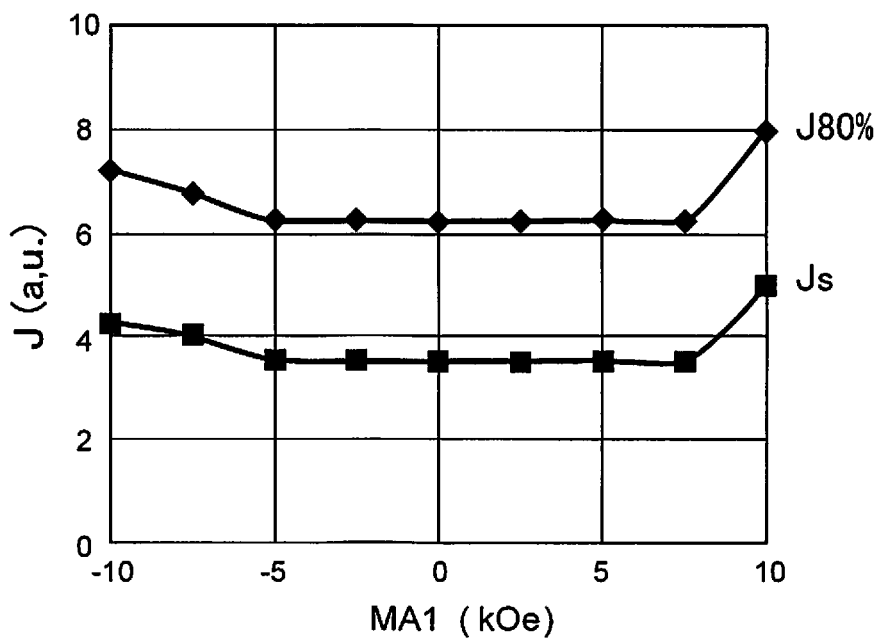
FIG. 10 is a graph of characteristics of the magnetic recording head and the magnetic recording and reproducing device according to the first embodiment.

FIG. 10 is a graph of characteristics of the magnetic recording head and the magnetic recording and reproducing device according to the first embodiment.

FIG. 10 shows the oscillation characteristics of the magnetic recording head 110. The horizontal axis represents a perpendicular magnetic anisotropic magnetic field MA1 (kOe) of the first magnetic layer 11. The vertical axis represents the current density J (arbitrary unit). The perpendicular magnetic anisotropic magnetic field MA1 is perpendicular crystal magnetic anisotropic. When the perpendicular magnetic anisotropic magnetic field MA1 is negative, the magnetization in a plane perpendicular to the stacking direction becomes easy. When the perpendicular magnetic anisotropic magnetic field MA1 is positive, the magnetization in a direction parallel to the stacking direction becomes easy. In FIG. 10, the oscillation start current density Js and the 80% current density J80% are shown. In the example shown in FIG. 10, the magnetic field (gap magnetic field Hgap) applied to the stacked body 10 is 10 kOe.

As shown in FIG. 10, in the case where the perpendicular magnetic anisotropic magnetic field MA1 of the first magnetic layer 11 is not less than −7 kOe and not more than 8 kOe, the low oscillation start current density Js is obtained. In this range, the low 80% current density J80% is obtained. In the embodiment, the perpendicular magnetic anisotropic magnetic field MA1 of the first magnetic layer 11 is favorable to be not less than −7 kOe and not more than 8 kOe. The perpendicular magnetic anisotropic magnetic field MA1 of the first magnetic layer 11 is further favorable to be not less than −5 kOe and not more than 7 kOe. Furthermore, the low oscillation start current density is and further low 80% current density J80% are obtained. For example, the absolute value of the perpendicular magnetic anisotropic magnetic field MA1 of the first magnetic layer 11 may be not more than 7 kOe. The absolute value of the perpendicular magnetic anisotropic magnetic field MA1 of the first magnetic layer 11 may be not more than 5 kOe.

Figure 11A:
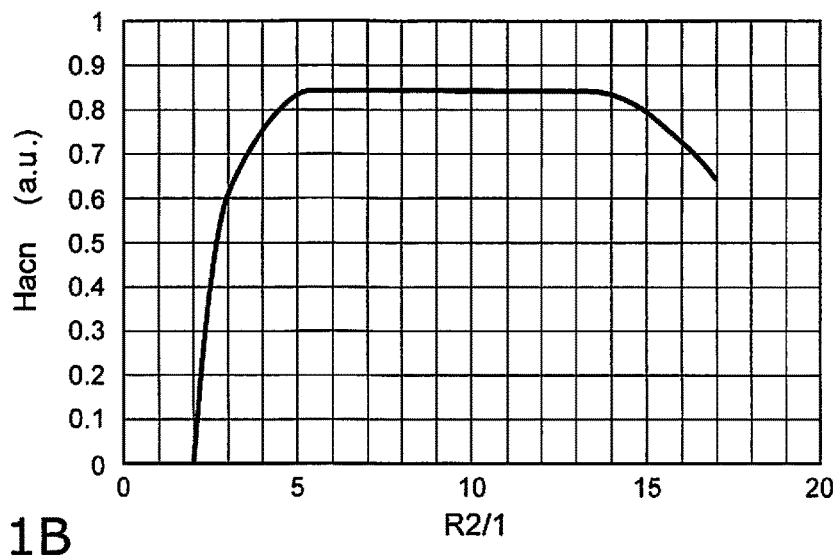
FIG. 11A to FIG. 11C are graphs of characteristics of the magnetic recording head and the magnetic recording and reproducing device according to the first embodiment.
Figure 11B:
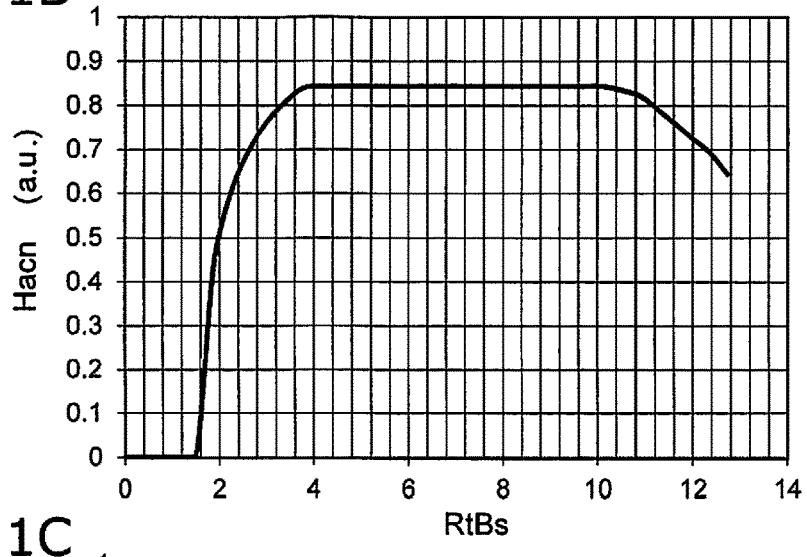
Figure 11C:
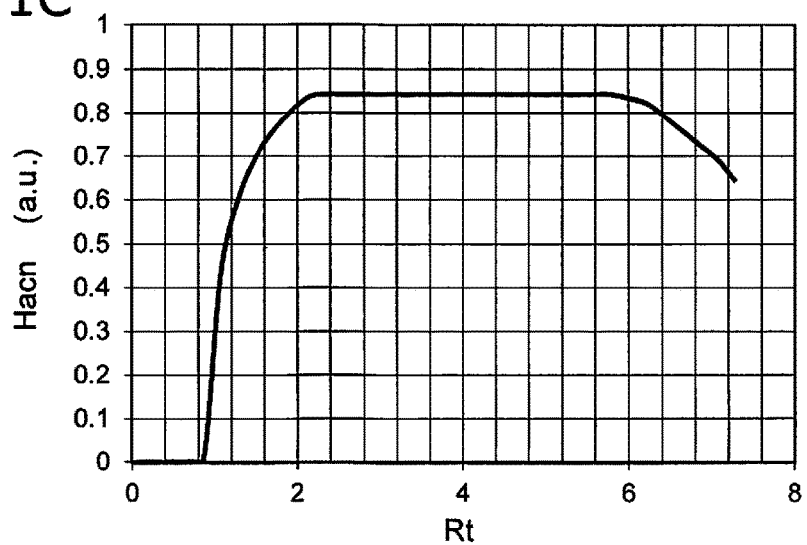

FIG. 11A to FIG. 11C are graphs of characteristics of the magnetic recording head and the magnetic recording and reproducing device according to the first embodiment.

These figures show the oscillation characteristics of the magnetic recording head 110. In FIG. 11A, the horizontal axis represents a ratio R2/1 of a magnetic damping volume of the second magnetic layer 12 to a magnetic damping volume of the first magnetic layer 11. The first magnetic layer 11 has a first damping constant a1. The second magnetic layer 12 has a second damping constant a2. As already described, the first magnetic layer 11 has the first thickness t1 and the first saturation magnetic flux density Bs1. The second magnetic layer 12 has the second thickness t2 and the second saturation magnetic flux density Bs2. The R2/1 is (a2·t2·Bs2)/(a1·t1·Bs1). The vertical axis of FIG. 11B represents the normalized intensity Hacn of the high frequency magnetic field Hac generated from the stacked body 10.

As shown in FIG. 11A, the high intensity Hacn is obtained at the R2/1 of not less than 4 and not more than 16. The R2/1 is favorable to be not less than 4 and not more than 16. The R2/1 is further favorable to be not less than 5 and not more than 14.

In the embodiment, for example, a product of the second product (t2·Bs2) and the second damping constant a2 is favorable to be not less than 4 times and not more than 16 times of a product of the first product (t1·Bs1) and the first damping constant a1.

In FIG. 11B, the horizontal axis represents a ratio RtBs of the magnetic film thickness of the second magnetic layer 12 to the magnetic film thickness of the first magnetic layer 11. The ratio RtBs corresponds to (t2·Bs2)/(t1·Bs1). The vertical axis of FIG. 11B represents the intensity Hacn. In this example, the first damping constant a1 is 0.03, and the second damping constant a2 is 0.04.

As shown in FIG. 11B, the high intensity Hacn is obtained at the ratio RtBs of not less than 3 and not more than 11. In the embodiment, the ratio RtBs is favorable to be, for example, not less than 3 and not more than 11. Particularly, the ratio RtBs is further favorable to be, for example, not less than 4 and not more than 10.

In FIG. 11C, the horizontal axis represents a ratio Rt of the second thickness t2 of the second magnetic layer 12 to the first thickness t1 of the first magnetic layer 11. The ratio Rt corresponds to t2/t1. The vertical axis of FIG. 11C represents the intensity Hacn. In this example, the first damping constant a1 is 0.03, and the second damping constant a2 is 0.04. The first saturation magnetic flux density Bs1 is 1.2 T, and the second saturation magnetic flux density Bs2 is 2.2 T.

As shown in FIG. 11C, the high intensity Hacn is obtained at the ratio Rt of not less than 1.5 and not more than 7. In the embodiment, the ratio Rt is favorable to be, for example, not less than 1.5 and not more than 7. Particularly, the ratio Rt is favorable to be, for example, not less than 2 and not more than 6.

In the embodiment, the magnetic pole 20 includes, for example, a FeCo alloy or a FeCoNi alloy or the like.

The shield 20s includes, for example, a FeCo alloy or a FeCoNi alloy or the like.

At least one of the first magnetic layer 11 or the second magnetic layer 12 includes, for example, at least one of a FeCo alloy, a Heusler alloy, a [Fe/Co] artificial lattice, a [FeCoNi/Ni] artificial lattice, or a [Co/Pt] artificial lattice. At least one of the first magnetic layer 11 or the second magnetic layer 12 may include a stacked film including at least two of a FeCo alloy film, a Heusler alloy film, a [Fe/Co] artificial lattice film, a [FeCoNi/Ni] artificial lattice film, or a [Co/Pt] artificial lattice film.

The intermediate layer 13 includes, for example, at least one of Cu or Ag. The intermediate layer 13 may include, for example, at least one of an alloy including Cu or an alloy including Ag. The intermediate layer 13 may include, for example, a stacked film including at least two of a Cu film, an Ag film, an alloy film including Cu, or an alloy film including Ag.

At least one of the first non-magnetic layer 15 or the second non-magnetic layer 16 includes, for example, at least one of Ta, Cu, Pt or Pd. At least one of the first non-magnetic layer 15 or the second non-magnetic layer 16 may include an alloy including one of them. At least one of the first non-magnetic layer 15 or the second non-magnetic layer 16 may include a stacked film including at least two of those films.

The magnetic recording medium 80 includes, for example, a CoCrPt—SiO$_2$ granular film.

Figure 12A:
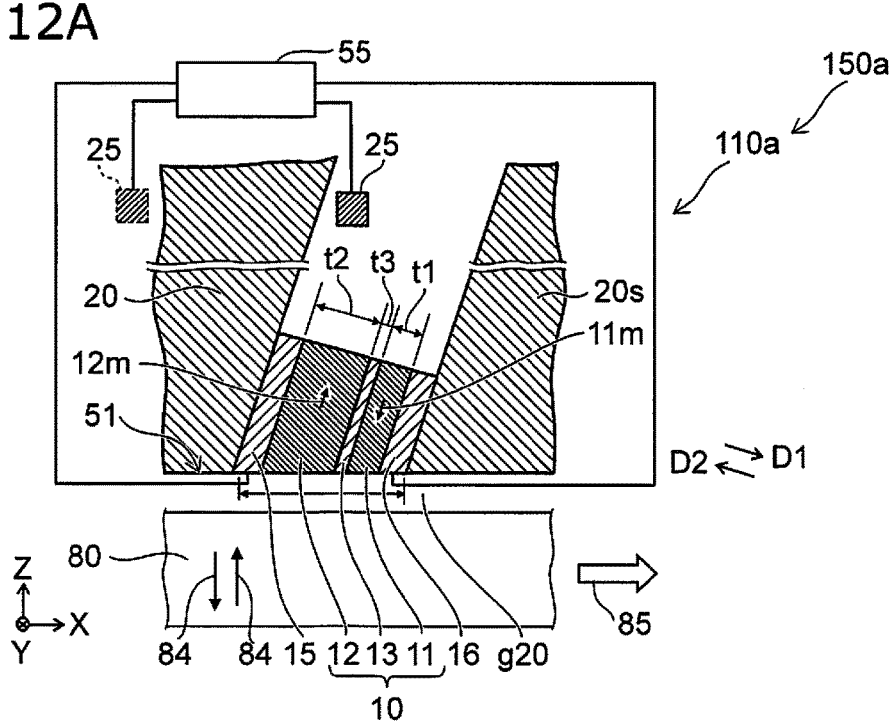
FIG. 12A to FIG. 12C are schematic cross-sectional views illustrating another magnetic recording head and another magnetic recording and reproducing device according to the first embodiment.
Figure 12B:
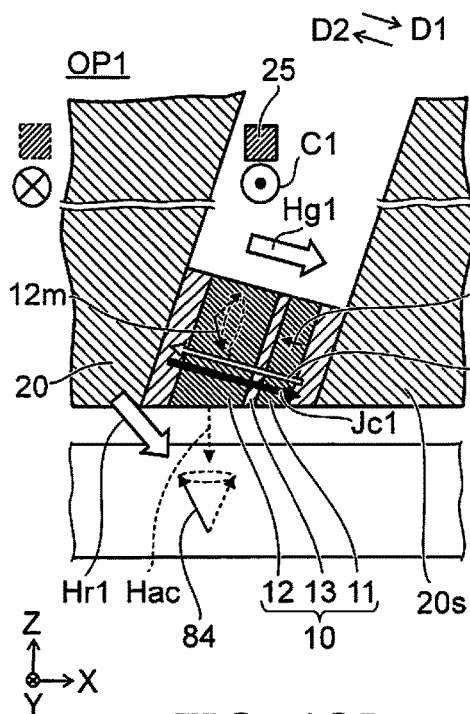
Figure 12C:
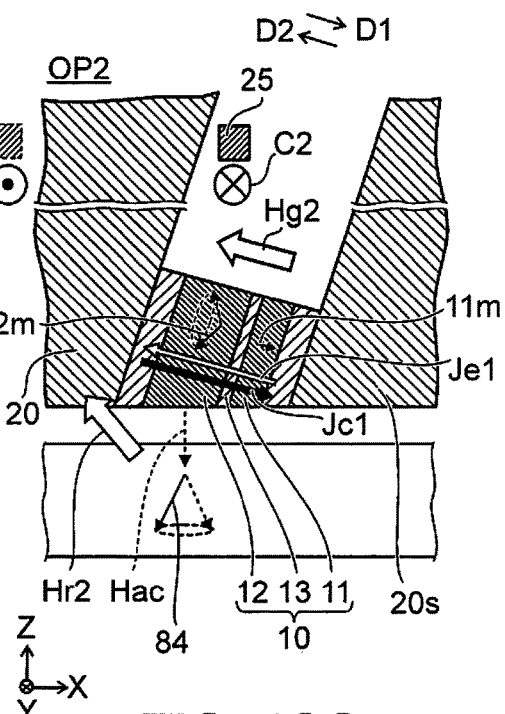

FIG. 12A to FIG. 12C are schematic cross-sectional views illustrating another magnetic recording head and another magnetic recording and reproducing device according to the first embodiment.

FIG. 12B and FIG. 12C illustrate states (operations) of the magnetic recording head and the magnetic recording and reproducing device.

As shown in FIG. 12A, a magnetic recording and reproducing device 150a according to the embodiment include a magnetic recording head 110a according to the embodiment and the magnetic recording medium 80. In the embodiment, the stacking direction of the first magnetic layer 11 and the second magnetic layer 12 is slanted to the medium-opposing surface 51. Other than the above is the same as the magnetic recording had 110.

Also in the magnetic recording head 110a and the magnetic recording and reproducing device 150a, the second product of the second thickness t2 and the second saturation magnetic flux density Bs2 is larger than the first product of the first thickness t1 and the first saturation magnetic flux density Bs1. For example, the first thickness t1 is thinner than the second thickness t2.

As shown in FIG. 12B and FIG. 12C, the current (first current Jc1) flows from the second magnetic layer 12 toward the first magnetic layer 11. Also in the magnetic recording head 110a and the magnetic recording and reproducing device 150a, a magnetic recording head capable of improving the recording density and a magnetic recording and reproducing device can be provided.

(Second Embodiment)

FIG. 13A to FIG. 13C are schematic cross-sectional views illustrating a magnetic recording head and a magnetic recording and reproducing device according to a second embodiment.

FIG. 13B and FIG. 13C illustrate states (operations) of the magnetic recording head and the magnetic recording and reproducing device.

As shown in FIG. 13A, a magnetic recording and reproducing device 151 according to the embodiment include a magnetic recording head 111 according to the embodiment and the magnetic recording medium 80. In the embodiment, disposition of the first magnetic layer 11 and the second magnetic layer 12 is different from the disposition in the magnetic recording head 110. In the following description of the magnetic recording head 111, portions similar to the magnetic recording head 110 are omitted appropriately.

The magnetic recording head 111 includes the magnetic pole 20, the shield 20s, the stacked body 10, and the first non-magnetic layer 15. The shield 20s is, for example, a trailing shield. The stacked body 10 includes the first magnetic layer 11, the second magnetic layer 12 and the intermediate layer 13. The first magnetic layer 11 is provided between the magnetic pole 20 and the shield 20s. The second magnetic layer 12 is provided between the first magnetic layer 11 and the shield 20s. The intermediate layer 13 is provided between the first magnetic layer 11 and the second magnetic layer 12, and non-magnetic.

The first non-magnetic layer 15 is provided between the second magnetic layer 12 and the shield 20s. The first non-magnetic layer 15 contacts the shield 20s and the second magnetic layer 12.

The second non-magnetic layer 16 is provided between the first magnetic layer 11 and the magnetic pole 20.

A direction from the second magnetic layer 12 toward the first magnetic layer 11 is taken as the first direction D1. The first direction D1 is reverse to the X-direction. A direction from the first magnetic layer 11 toward the second magnetic layer 12 is taken as the second direction D2. The second direction D2 is the same as the X-direction.

Also in this example, the first magnetic layer 11 has the first thickness t1 along the first direction D1 and the first saturation magnetic flux density Bs1. The second magnetic layer 12 has the second thickness t2 along the first direction D1 and the first saturation magnetic flux density Bs2. Also in this example, the second product of the second thickness t2 and the second saturation magnetic flux density Bs2 is larger than the first product of the first thickness t1 and the first saturation magnetic flux density Bs1.

FIG. 13B corresponds to the first operation OP1 (first state). In the first state, the first magnetic pole magnetic field Hg1 generated from the magnetic pole 20 has a component along the second direction D2. At this time, the first current Jc1 in the first direction D1 flows in the stacked body 10. At this time, the direction of the first electron flow Je1 is reverse to the direction of the first current Jc1.

FIG. 13C corresponds to the second operation OP2 (second state). In the second state, the second magnetic pole magnetic field Hg2 generated from the magnetic pole 20 has a component along the first direction D1. Also at this time, the first current Jc1 in the first direction D1 flows in the stacked body 10.

Due to the operations like this, even if the first magnetic layer 11 is made thin, the excellent high frequency magnetic field Hac is obtained. Thereby, a magnetic recording head capable of improving the recording density and a magnetic recording and reproducing device can be provided.

In the embodiment, the second product is favorable to be not less than 4 times of the first product. The second thickness t2 is favorable to be not less than 2 times of the first thickness t1.

For example, the first thickness t1 is favorable to be not less than 2 nm and not more than 9 nm. The perpendicular magnetic anisotropic magnetic field MA1 of the first magnetic layer 11 is favorable to be, for example, not less than −7 kOe and not more than 8 kOe.

In the embodiment, the first magnetic layer 11 has a first damping constant a1. The second magnetic layer 12 has a second damping constant a2. At this time, a product of the second product and the second damping constant a2 is favorable to be not less than 4 times and not more than 16 times of a product of the first product and the first damping constant a1.

In the embodiment, in the first state, the magnetization 11m of the first magnetic layer 11 has a component of the second direction D2. In the second state, the magnetization Urn of the first magnetic layer 11 has a component of the first direction D1.

In the first state and the second state, the stacked body 10 generates the high frequency magnetic field Hac. The frequency of the high frequency magnetic field Hac is not less than 5 GHz and not more than 25 GHz.

When while flowing the first current Jc1 in the stacked body 10, the third magnetic field having a component of the first direction D1 is applied, the electrical resistance between the first magnetic layer 11 and the second magnetic layer 12 increases with the intensity of the third magnetic field.

When while flowing a third current in the first direction D1 having a first range in the stacked body 10, the third magnetic field having the component of the first direction D1 is applied, the electrical resistance between the first magnetic layer 11 and the second magnetic layer 12 increases with the intensity of the third magnetic field. The magnitude of the above first current Jc1 is in the first range like this.

In the embodiment, the coil 25 may be provided. In the first state, a first coil current C1 is supplied to the coil 25, and the first magnetic pole magnetic field Hg1 is generated from the magnetic pole 20. In the second state, a second coil current C2 is supplied to the coil 25, and the second magnetic pole magnetic field Hg2 is generated from the magnetic pole 20.

In the embodiment, the controller 55 may be further provided. In the first state, the controller 55 supplies the first coil current C1 to a coil 25 and supplies the first current Jc1 to the stacked body 10. In the second state, the controller 55 supplies the second coil current C2 to the coil 25 and supplies the first current Jc1 to the stacked body 10.

(Third Embodiment)

Figure 14A:
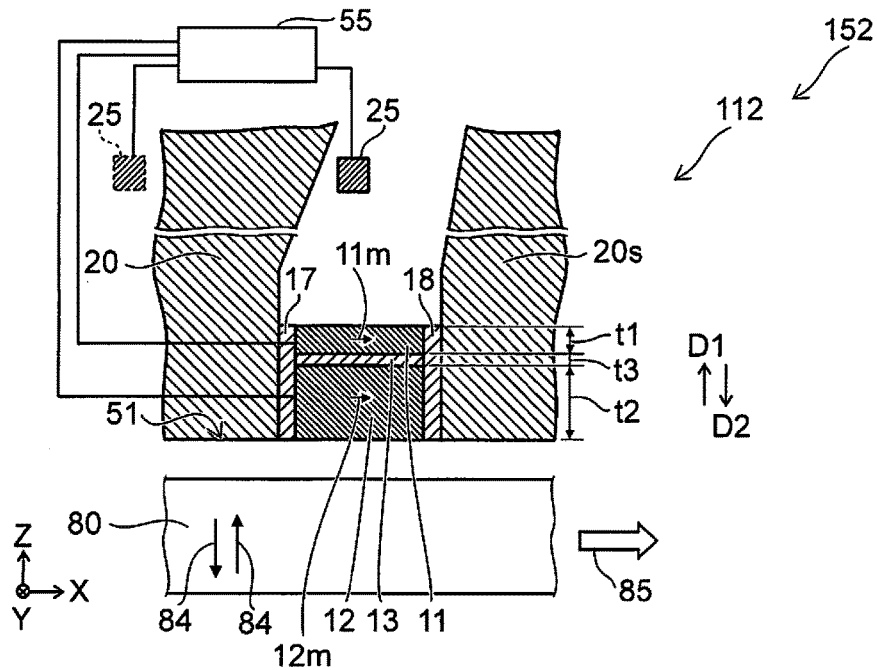
FIG. 14A to FIG. 14C are schematic cross-sectional views illustrating a magnetic recording head and a magnetic recording and reproducing device according to a third embodiment.
Figures 14B, 14C:
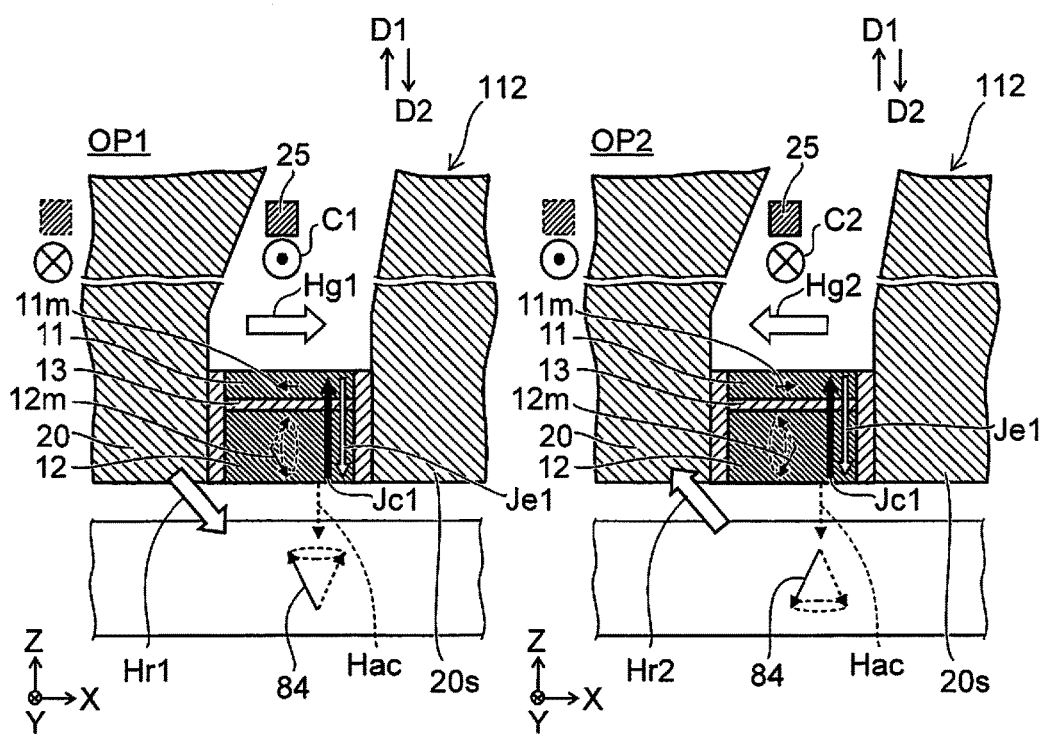

FIG. 14A to FIG. 14C are schematic cross-sectional views illustrating a magnetic recording head and a magnetic recording and reproducing device according to a third embodiment.

As shown in FIG. 14A, a magnetic recording and reproducing device 152 according to the embodiment include a magnetic recording head 112 according to the embodiment and the magnetic recording medium 80. In the embodiment, disposition of the first magnetic layer 11 and the second magnetic layer 12 is different from the disposition in the magnetic recording head 110. In the following description of the magnetic recording head 112, portions similar to the magnetic recording head 110 are omitted appropriately.

The magnetic recording head 112 includes the magnetic pole 20, the shield 20s, and the stacked body 10. The shield 20s is, for example, a trailing shield. The stacked body 10 is provided between the magnetic pole 20 and the shield 20s. The stacked body 10 includes the first magnetic layer 11, the second magnetic layer 12 and the intermediate layer 13. The first magnetic layer 11 is provided between the magnetic pole 20 and the shield 20s. The second magnetic layer 12 is separated from the first magnetic layer 11 in a direction (in this example, Z-direction) crossing the direction from the magnetic pole 20 toward the shield 20s. The intermediate layer 13 is provided between the first magnetic layer 11 and the second magnetic layer 12, and non-magnetic.

The magnetic pole 20 has the medium-opposing surface 51. A distance between the medium-opposing surface 51 and the first magnetic layer 11 is longer than a distance between the medium-opposing surface 51 and the second magnetic layer 12. For example, the second magnetic layer 12 is located between the first magnetic layer 11 and the magnetic recording medium 80.

A direction from the second magnetic layer 12 toward the first magnetic layer 11 is taken as the first direction D1. The first direction D1 corresponds to the Z-direction. A direction from the first magnetic layer 11 toward the second magnetic layer 12 is taken as the second direction D2. The second direction D2 is reverse (antiparallel) to the Z-direction.

Also in this example, the first magnetic layer 11 has the first thickness t1 along the first direction D1 and the first saturation magnetic flux density Bs1. The second magnetic layer 12 has the second thickness t2 along the first direction D1 and the second saturation magnetic flux density Bs2. Also in this example, the second product of the second thickness t2 and the second saturation magnetic flux density Bs2 is larger than the first product of the first thickness t1 and the first saturation magnetic flux density Bs1.

In this example, a first insulating layer 17 and a second insulating layer 18 are further provided. The first insulating layer 17 is provided between the magnetic pole 20 and the stacked body 10. The second insulating layer 18 is provided between the shield 20s and the stacked body 10.

Also in this example, the current (first current Jc1) flows from the second magnetic layer 12 toward the first magnetic layer 11.

FIG. 14B corresponds to the first operation OP1 (first state). In the first state, the first magnetic pole magnetic field Hg1 generated from the magnetic pole 20 has a component along the direction (+X-direction) from the magnetic pole 20 toward the shield 20s. The first current Jc1 flows in the first direction D1 in the stacked body 10. At this time, the direction of the first electron flow Je1 is reverse to the direction of the first current Jc1.

FIG. 14C corresponds to the second operation OP2 (second state). In the second state, the second magnetic pole magnetic field Hg2 generated from the magnetic pole 20 has a component along the direction (−X-direction) from the shield 20s toward the magnetic pole 20. Also at this time, the first current Jc1 flows in the first direction D1 in the stacked body 10.

Due to the operations like this, even if the first magnetic layer 11 is made thin, the excellent high frequency magnetic field Hac is obtained. Thereby, a magnetic recording head capable of improving the recording density and a magnetic recording and reproducing device can be provided.

In the embodiment, the second product is favorable to be not less than 4 times of the first product. The second thickness t2 is favorable to be not less than 2 times of the first thickness t1.

For example, the first thickness t1 is favorable to be not less than 2 nm and not more than 9 nm. The perpendicular magnetic anisotropic magnetic field MA1 of the first magnetic layer 11 is favorable to be, for example, not less than −7 kOe and not more than 8 kOe.

In the embodiment, the first magnetic layer 11 has a first damping constant a1. The second magnetic layer 12 has a second damping constant a2. At this time, a product of the second product and the second damping constant a2 is favorable to be not less than 4 times and not more than 16 times of a product of the first product and the first damping constant a1.

In the embodiment, in the first state, the magnetization 11m of the first magnetic layer 11 has a component of the direction from the shield 20s toward the magnetic pole 20, as shown in FIG. 14B. In the second state, the magnetization 11m of the first magnetic layer 11 has a component of the direction from the magnetic pole 20 toward the shield 20s, as shown in FIG. 14C.

In the first state and the second state, the stacked body 10 generates the high frequency magnetic field Hac. The frequency of the high frequency magnetic field Hac is not less than 5 GHz and not more than 25 GHz.

When while flowing the first current Jc1 in the stacked body 10, the third magnetic field having a component of the X-direction is applied, the electrical resistance between the first magnetic layer 11 and the second magnetic layer 12 increases with the intensity of the third magnetic field.

In the embodiment, the coil 25 may be provided. In the first state, a first coil current C1 is supplied to the coil 25, and the first magnetic pole magnetic field Hg1 is generated from the magnetic pole 20. In the second state, a second coil current C2 is supplied to the coil 25, and the second magnetic pole magnetic field Hg2 is generated from the magnetic pole 20.

In the embodiment, the controller 55 may be further provided. In the first state, the controller 55 supplies the first coil current C1 to the coil 25 and supplies the first current Jc1 to the stacked body 10. In the second state, the controller 55 supplies the second coil current C2 to the coil 25 and supplies the first current Jc1 to the stacked body 10.

(Fourth Embodiment)

The fourth embodiment is accorded to a magnetic memory device. The magnetic memory device according to the embodiment includes a magnetic recording head of one of the first to third embodiments and the variations, and the magnetic recording medium 80. Information is recorded to the magnetic recording medium 80 by the magnetic pole 20. The controller 55 may be further provided.

The controller 55 implements the first operation OP1 and the second operation OP2. In the first operation OP1 and the second operation OP2, the controller 55 supplies the first current Jc1 to the stacked body 10.

In the embodiment, the recording head further includes the coil 25. In the first operation OP1, the controller 55 supplies the first coil current C1 to the coil 25 and generates the first magnetic pole magnetic field Hg1 from the magnetic pole 20. In the second operation OP2, the controller 55 supplies the second coil current C2 to the coil 25 and generates the second magnetic pole magnetic field Hg2 from the magnetic pole 20.

In the following, the case where the magnetic recording head 110 is used will be described.

Figure 15:
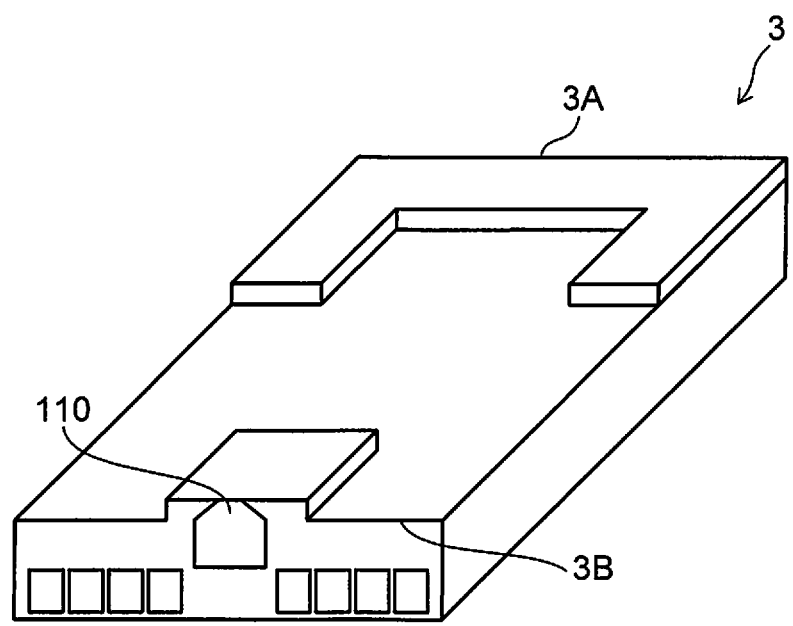
FIG. 15 is a schematic perspective view illustrating a portion of a magnetic recording and reproducing device according to a fourth embodiment.

FIG. 15 is a schematic perspective view illustrating a portion of a magnetic recording and reproducing device according to the fourth embodiment.

FIG. 15 illustrates a head slider to which the magnetic recording head is mounted.

The magnetic recording head 110 is mounted to the head slider 3. The head slider 3 includes, for example, $Al_2O_3$/TiC, etc. The head slider 3 moves relative to the magnetic recording medium 80 while flying over or contacting the magnetic recording medium 80.

The head slider 3 has, for example, an air inflow side 3A and an air outflow side 3B. The magnetic recording head 110 is disposed at the side surface of the air outflow side 3B of the head slider 3 or the like. Thereby, the magnetic recording head 110 that is mounted to the head slider 3 moves relative to the magnetic recording medium 80 while flying over or contacting the magnetic recording medium 80.

Figure 16:
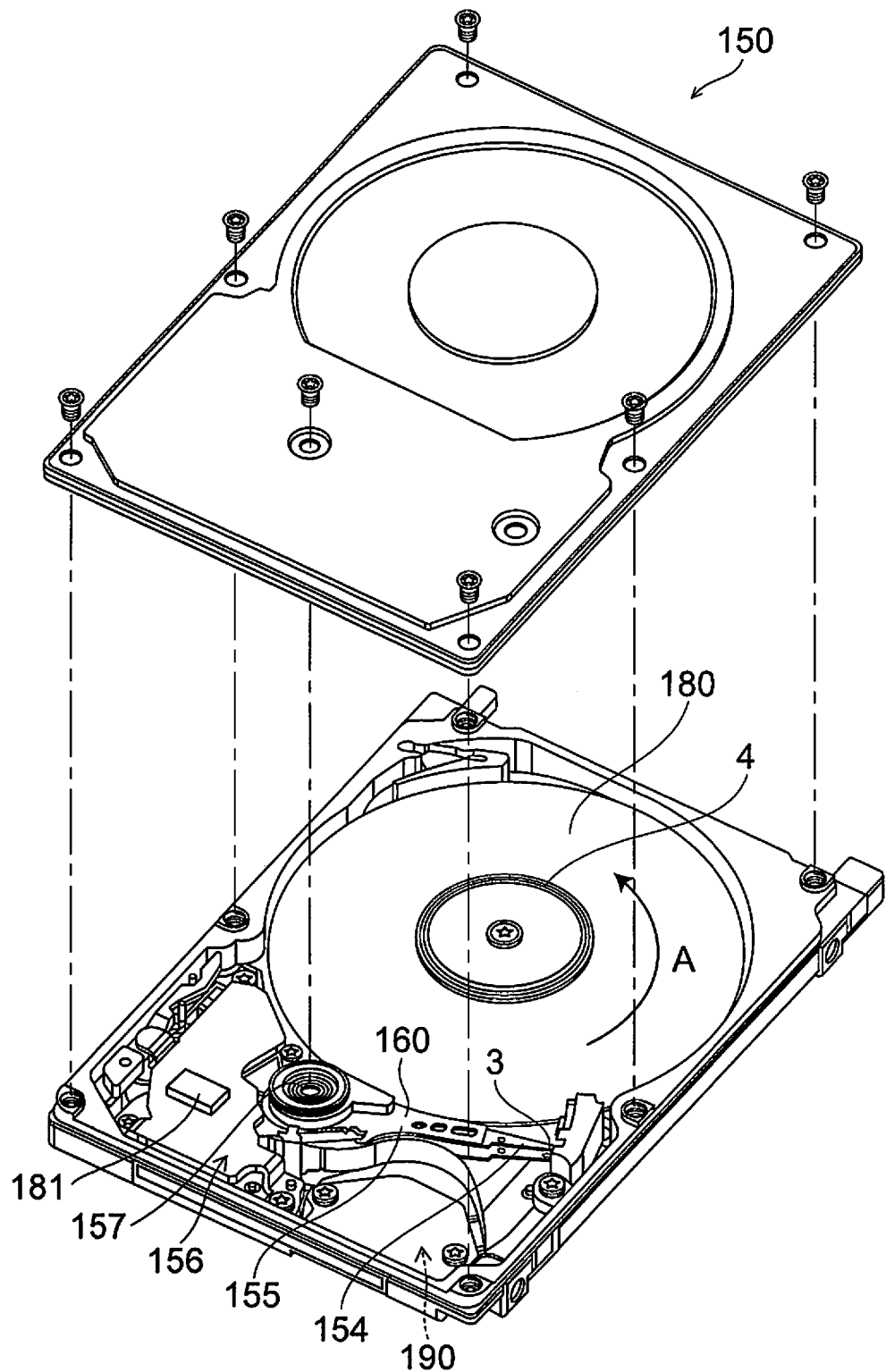
FIG. 16 is a schematic perspective view illustrating the magnetic recording and reproducing device according to the embodiment.

FIG. 16 is a schematic perspective view illustrating the magnetic recording and reproducing device according to the embodiment.

Figure 17A:
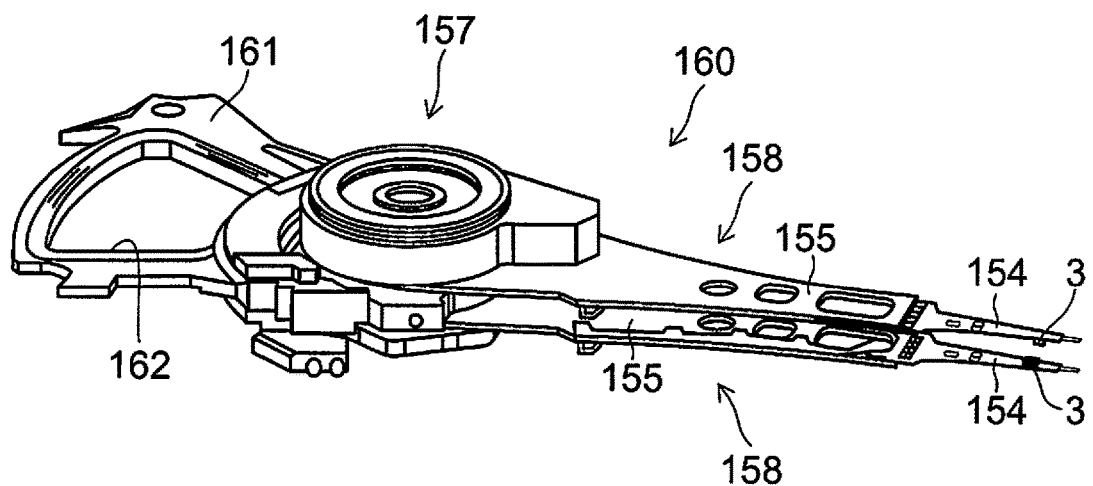
FIG. 17A and FIG. 17B are schematic perspective views illustrating a portion of the magnetic recording and reproducing device.
Figure 17B:
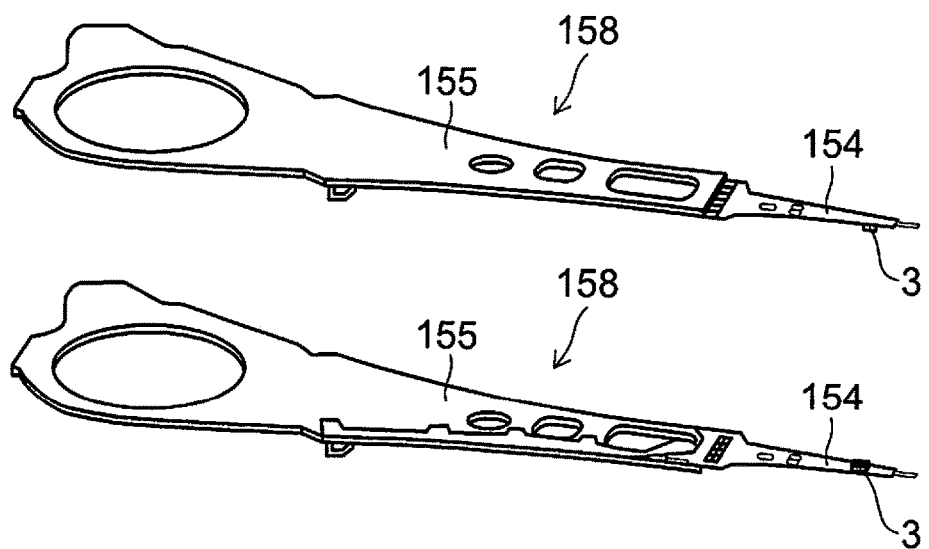

FIG. 17A and FIG. 17B are schematic perspective views illustrating portions of the magnetic recording and reproducing device.

As shown in FIG. 16, the magnetic recording and reproducing device 150 according to the embodiment is a device that uses a rotary actuator. A recording medium disk 180 is mounted to a spindle motor 4 and is rotated in the direction of arrow A by a motor that responds to a control signal from a drive device controller. The magnetic recording and reproducing device 150 according to the embodiment may include multiple recording medium disks 180. The magnetic recording and reproducing device 150 may include a recording medium 181. For example, the magnetic recording and reproducing device 150 is a hybrid HDD (Hard Disk Drive). The recording medium 181 is, for example, a SSD (Solid State Drive). The recording medium 181 includes, for example, nonvolatile memory such as flash memory, etc.

The head slider 3 that performs the recording and reproducing of the information stored in the recording medium disk 180 has a configuration such as that described above and is mounted to the tip of a suspension 154 having a thin-film configuration. Here, for example, one of the magnetic recording heads according to the embodiments described above is mounted at the tip vicinity of the head slider 3.

When the recording medium disk 180 rotates, the medium-opposing surface (the ABS) of the head slider 3 is held at a prescribed fly height from the surface of the recording medium disk 180 by the balance between the downward pressure due to the suspension 154 and the pressure generated by the medium-opposing surface of the head slider 3. A so-called "contact-sliding" head slider 3 that contacts the recording medium disk 180 may be used.

The suspension 154 is connected to one end of the arm 155 (e.g., the actuator arm). The arm 155 includes, for example, a bobbin unit holding a drive coil, etc. A voice coil motor 156 which is one type of linear motor is provided at one other end of the arm 155. The voice coil motor 156 may include a drive coil that is wound onto the bobbin unit of the arm 155, and a magnetic circuit made of a permanent magnet and an opposing yoke that are disposed to oppose each other with the coil interposed. The suspension 154 has one end and one other end; the magnetic recording head is mounted to the one end of the suspension 154; and the arm 155 is connected to the one other end of the suspension 154.

The arm 155 is held by ball bearings provided at two locations on and under a bearing unit 157; and the arm 155 can be caused to rotate and slide unrestrictedly by the voice coil motor 156. As a result, the magnetic recording head is movable to any position of the recording medium disk 180.

FIG. 17A illustrates the configuration of a portion of the magnetic recording and reproducing device and is an enlarged perspective view of a head stack assembly 160.

FIG. 17B is a perspective view illustrating a magnetic recording head assembly (head gimbal assembly (HGA)) 158 which is a portion of the head stack assembly 160.

As shown in FIG. 17A, the head stack assembly 160 includes the bearing unit 157, the head gimbal assembly 158, and a support frame 161. The head gimbal assembly 158 extends from the bearing unit 157. The support frame 161 extends from the bearing unit 157 in the opposite direction of the HGA. The support frame 161 supports a coil 162 of the voice coil motor.

As shown in FIG. 17B, the head gimbal assembly 158 includes the arm 155 that extends from the bearing unit 157, and the suspension 154 that extends from the arm 155.

The head slider 3 is mounted to the tip of the suspension 154. One of the magnetic recording heads according to the embodiments is mounted to the head slider 3.

That is, the magnetic recording head assembly (the head gimbal assembly) 158 according to the embodiment includes the magnetic recording head according to the embodiment, the head slider 3 to which the magnetic recording head is mounted, the suspension 154 that has the head slider 3 mounted to one end of the suspension 154, and the arm 155 that is connected to the other end of the suspension 154.

The suspension 154 includes lead wires (not shown) that are for recording and reproducing signals, for a heater that adjusts the fly height, for example, for a spin torque oscillator, etc. The lead wires are electrically connected to electrodes of the magnetic recording head embedded in the head slider 3.

A signal processor 190 that performs recording and reproducing of the signals to and from the magnetic recording medium by using the magnetic recording head also is provided. For example, the signal processor 190 is provided on a portion of the magnetic recording and reproducing device 150 (see FIG. 16). The input/output lines of the signal processor 190 are electrically coupled to the magnetic recording head by being connected to electrode pads of the head gimbal assembly 158.

In this way, the magnetic recording and reproducing device 150 according to the embodiment includes a magnetic recording medium, the magnetic recording head according to the embodiment recited above, a movable unit that is relatively movable in a state in which the magnetic recording medium and the magnetic recording head are separated from each other or in contact with each other, a position controller that aligns the magnetic recording head at a prescribed recording position of the magnetic recording medium, and a signal processor that records and reproduces signals to and from the magnetic recording medium by using the magnetic recording head.

That is, the recording medium disk 180 is used as the magnetic recording medium recited above.

The movable unit recited above may include the head slider 3.

The position controller recited above may include the head gimbal assembly 158.

In this way, the magnetic recording and reproducing device 150 according to the embodiment includes the magnetic recording medium, the magnetic recording head assembly according to the embodiment, and the signal processor that records and reproduces signals to and from the magnetic recording medium by using the magnetic recording head mounted to the magnetic recording head assembly.

According to the embodiment, a magnetic recording and reproducing device capable of improving a recording density and a magnetic recording and reproducing device are provided.

In this specification, "perpendicular" and "parallel" include not only strictly perpendicular and strictly parallel but also, for example, the fluctuation due to manufacturing processes, etc.; and it is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording heads such as shields, magnetic poles, side shields, included in magnetic recording devices such as magnetic recording media, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices practicable by an appropriate design modification by one skilled in the art based on the magnetic recording devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording and reproducing device, comprising:
   a magnetic recording head; and
   a controller,
   the magnetic recording head including:
      a magnetic pole;
      a shield; and
      a stacked body provided between the magnetic pole and the shield, the stacked body including
         a first magnetic layer,
         a second magnetic layer being separated from the first magnetic layer in a direction crossing a direction from the magnetic pole toward the shield,
         an intermediate layer provided between the first magnetic layer and the second magnetic layer, the intermediate layer being non-magnetic,
      the first magnetic layer having a first thickness and a first saturation magnetic flux density, the first thickness being along a first direction from the second magnetic layer toward the first magnetic layer,
      the second magnetic layer having a second thickness along the first direction and a second saturation magnetic flux density, and
      a second product of the second thickness and the second saturation magnetic flux density being larger than a first product of the first thickness and the first saturation magnetic flux density,
      the controller is configured to flow a current in the stacked body from the second magnetic layer toward the first magnetic layer,
   wherein
      in a first state, a first magnetic pole magnetic field is generated from the magnetic pole, the first magnetic pole magnetic field having a component along the direction from the magnetic pole toward the shield,
      in a second state, a second magnetic pole magnetic field is generated from the magnetic pole, the second magnetic pole magnetic field having a component along a direction from the shield toward the magnetic pole, and
      in the first state, magnetization of the first magnetic layer has a component along the direction from the shield toward the magnetic pole.

2. The device according to claim 1, wherein
   the magnetic pole has a medium-opposing surface, and
   a distance between the medium-opposing surface and the first magnetic layer is longer than a distance between the medium-opposing surface and the second magnetic layer.

3. The device according to claim 1, wherein
   in the second state, the magnetization of the first magnetic layer has a component along the direction from the magnetic pole toward the shield.

4. The device according to claim 1, wherein the shield is a trailing shield.

5. The device according to claim 1, wherein the second product is not less than 4 times of the first product.

6. The device according to claim 1, wherein the second thickness is not less than 2 times of the first thickness.

7. The device according to claim 1, wherein the first thickness is not less than 2 nanometers and not more than 9 nanometers.

8. The device according to claim 1, wherein a perpendicular magnetic anisotropic magnetic field of the first magnetic layer is not less than −7 kilooersted and not more than 9 kilooersted.

9. The device according to claim 1, wherein
   the first magnetic layer has a first damping constant,
   the second magnetic layer has a second damping constant, and
   a product of the second product and the second damping constant is not less than 4 times and not more than 16 times of a product of the first product and the first damping constant.

10. The device according to claim 1, wherein an electrical resistance between the first magnetic layer and the second magnetic layer increases with an intensity of a magnetic field having a component along the first direction when the current is flown in the stacked body.

11. The device according to claim 1, wherein
   in the first state and the second state, the stacked body generates a high frequency magnetic field.

12. The device according to claim 11, wherein a frequency of the high frequency magnetic field is not less than 5 gigahertz and not more than 25 gigahertz.

13. The device according to claim 1, wherein the magnetic recording head further includes a coil,
   in the first state, a first coil current is supplied to the coil and the first magnetic pole magnetic field is generated from the magnetic pole, and
   in the second state, a second coil current is supplied to the coil and the second magnetic pole magnetic field is generated from the magnetic pole.

14. The device according to claim 13, wherein
   the controller supplies the first coil current to the coil while supplying the current to the stacked body in a first operation, and
   the controller supplies the second coil current to the coil while supplying the current to the stacked body in a second operation, the second coil current being reversely directed to the first coil current.

15. The device according to claim 1, further comprising:
   a magnetic recording medium,
   information being recorded to the magnetic recording medium by the magnetic pole.

16. The device according to claim 15, wherein
   the magnetic recording medium is a perpendicular magnetic recording medium.

* * * * *